United States Patent
Ohta et al.

(10) Patent No.: US 10,708,877 B2
(45) Date of Patent: Jul. 7, 2020

(54) WIRELESS COMMUNICATIONS SYSTEM, CONTROL STATION, AND TERMINAL

(71) Applicant: FUJITSU LIMITED, Kawasaki-shi, Kanagawa (JP)

(72) Inventors: Yoshiaki Ohta, Yokohama (JP); Shinichiro Aikawa, Yokohama (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/020,432

(22) Filed: Jun. 27, 2018

(65) Prior Publication Data

US 2018/0310271 A1   Oct. 25, 2018

Related U.S. Application Data

(63) Continuation of application No. 15/636,045, filed on Jun. 28, 2017, now Pat. No. 10,051,592, which is a
(Continued)

(51) Int. Cl.
*H04W 64/00* (2009.01)
*H04W 84/10* (2009.01)
(Continued)

(52) U.S. Cl.
CPC ........... *H04W 64/00* (2013.01); *H04W 8/005* (2013.01); *H04W 8/082* (2013.01); *H04W 76/14* (2018.02);
(Continued)

(58) Field of Classification Search
CPC ...... H04W 64/00; H04W 76/14; H04W 88/02
(Continued)

(56) References Cited

U.S. PATENT DOCUMENTS 10,051,592 B2 *  8/2018  Ohta ................... H04W 84/10
2010/0232503 A1  9/2010  Morimoto et al.
(Continued)

FOREIGN PATENT DOCUMENTS

EP   3 179 756 A1   6/2017
JP   2000-333257 A  11/2000
(Continued)

OTHER PUBLICATIONS

Notice of Final Rejection issued by the Korean Intellectual Property Office for corresponding Korean Patent Application No. 10-2017-7018454, dated Jun. 18, 2018, with English translation.
(Continued)

*Primary Examiner* — Nghi H Ly
(74) *Attorney, Agent, or Firm* — Myers Wolin, LLC

(57) ABSTRACT

A wireless communications system including a base station and a terminal, the wireless communications system capable of communications between terminals through a first path and communications between terminals through a second path which different the first path, the wireless communications system includes: a plurality of terminals; and the base station including to: a memory; and a processor coupled to the memory, the processor configured to process related to proximity-based communications between a plurality of terminals; obtain identifiers of the terminal and information enables determination of whether to use the second path.

12 Claims, 16 Drawing Sheets

Related U.S. Application Data continuation of application No. PCT/JP2015/050690, filed on Jan. 13, 2015.

(51) Int. Cl.

| | | |
|---|---|---|
| H04W 92/18 | (2009.01) | |
| H04W 8/08 | (2009.01) | |
| H04W 76/14 | (2018.01) | |
| H04W 8/00 | (2009.01) | |
| H04W 36/00 | (2009.01) | |
| H04W 88/02 | (2009.01) | |
| H04W 88/08 | (2009.01) | |

(52) U.S. Cl.
CPC ........... *H04W 84/10* (2013.01); *H04W 92/18* (2013.01); *H04W 36/03* (2018.08); *H04W 88/02* (2013.01); *H04W 88/08* (2013.01)

(58) Field of Classification Search
USPC ............. 455/456.1, 422.1, 418, 414.1, 404.2
See application file for complete search history.

(56) References Cited

U.S. PATENT DOCUMENTS

| | | | |
|---|---|---|---|
| 2012/0140740 A1* | 6/2012 | Iwamura ........... | H04W 36/0077 370/331 |
| 2014/0248901 A1 | 9/2014 | Johnsson et al. | |
| 2015/0004984 A1 | 1/2015 | Kim et al. | |
| 2015/0036657 A1* | 2/2015 | Hong ................... | H04W 36/32 370/331 |
| 2016/0128116 A1 | 5/2016 | Kim et al. | |

FOREIGN PATENT DOCUMENTS

| | | |
|---|---|---|
| JP | 2005-347879 A | 12/2005 |
| JP | 2006-211614 A | 8/2006 |
| JP | 2012-110035 A | 6/2012 |
| JP | 2013-065935 A | 4/2013 |
| WO | 2013/170134 A2 | 11/2013 |
| WO | 2014/185649 A1 | 11/2014 |

OTHER PUBLICATIONS

3GPP TS 36.300 V12.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2014.
3GPP TS 36.211 V12.1.0, "3rd Generation Partnership Project; Technical Specification Group Radio Access Network; Evolved Universal Terrestrial Radio Access (E-UTRA); Physical channels and modulation (Release 12)", Mar. 2014.
3GPP TS 36.212 V12.0.0, "3rd Generation Partnership Project; Technical Specification Group Radio Access Network; Evolved Universal Terrestrial Radio Access (E-UTRA); Multiplexing and channel coding (Release 12)", Dec. 2013.
3GPP TS 36.213 V12.1.0, "3rd Generation Partnership Project; Technical Specification Group Radio Access Network; Evolved Universal Terrestrial Radio Access (E-UTRA); Physical layer procedures (Release 12)", Mar. 2014.
3GPP TS 36.321 V12.0.0, "3rd Generation Partnership Project; Technical Specification Group Radio Access Network; Evolved Universal Terrestrial Radio Access (E-UTRA); Medium Access Control (MAC) protocol specification (Release 12)", Dec. 2013.
3GPP TS 36.322 V11.0.0, "3rd Generation Partnership Project; Technical Specification Group Radio Access Network; Evolved Universal Terrestrial Radio Access (E-UTRA); Radio Link Control (RLC) protocol specification (Release 11)", Sep. 2012.
3GPP TS 36.323 V11.2.0 , "3rd Generation Partnership Project; Technical Specification Group Radio Access Network; Evolved Universal Terrestrial Radio Access (E-UTRA); Packet Data Convergence Protocol (PDCP) specification (Release 11)", Mar. 2013.
3GPP TS 36.331 V12.0.0, "3rd Generation Partnership Project; Technical Specification Group Radio Access Network; Evolved Universal Terrestrial Radio Access (E-UTRA); Radio Resource Control (RRC); Protocol specification (Release 12)", Dec. 2013.
3GPP TS 36.413 V12.0.0, "3rd Generation Partnership Project; Technical Specification Group Radio Access Network; Evolved Universal Terrestrial Radio Access Network (E-UTRAN); S1 Application Protocol (S1AP) (Release 12)", Dec. 2013.
3GPP TS 36.423 V12.0.0, "3rd Generation Partnership Project; Technical Specification Group Radio Access Network; Evolved Universal Terrestrial Radio Access Network (E-UTRAN); X2 application protocol (X2AP) (Release 12)", Dec. 2013.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
3GPP TR 36.843 V12.0.0, "3rd Generation Partnership Project; Technical Specification Group Radio Access Network; Study on LTE device to device proximity services; Radio aspects (Release 12)", Mar. 2014.
3GPP TR 22.807 V1.0.0, "3rd Generation Partnership Project; Technical Specification Group Services and System Aspects; Study on Enhancements for Infrastructure-based Data Communication between Devices (Release 13)", Jun. 2014.
3GPP TS 33.303 V12.0.0, "3rd Generation Partnership Project; Technical Specification Group Services and System Aspects; Proximity-based Services (ProSe); Security aspects (Release 12)", Jun. 2014.
3GPP TS 24.301 V12.6.0, "3rd Generation Partnership Project; Technical Specification Group Core Network and Terminals; Non-Access-Stratum (NAS) protocol for Evolved Packet System (EPS); Stage 3 (Release 12)", Sep. 2014.
International Search Report for corresponding International Patent Application No. PCT/JP2015/050690 dated Mar. 31, 2015.
International Preliminary Report on Patentability with Written Opinion of the International Searching Authority for corresponding International Patent Application No. PCT/JP2015/050690 dated Mar. 31, 2015, with English translation.
3GPP TS 23.303 V12.3.0, "3rd Generation Partnership Project; Technical Specification Group Services and System Aspects; Proximity-based services (ProSe); Stage 2 (Release 12)", Dec. 2014.
LG Electronics, Inc., "Considerations for Forms of Data Paths in eICBD", Agenda Item: 8.5, 3GPP TSG-SA WG1 Meeting #65, S1-140021(revision of S1-14xxxx) Taipei, Taiwan, Jan. 20-24, 2014.
Extended European search report with supplementary European search report and the European search opinion issued by the European Patent Office for corresponding European Patent Application No. 15877804.3, dated Oct. 12, 2017.
Notice of Preliminary Rejection issued by the Korean Intellectual Property Office for corresponding Korean Patent Application No. 10-2017-7018454, dated Mar. 20, 2018, with English translation.
Decision of Refusal issued by the Japan Patent Office for corresponding Japanese Patent Application No. 2016-569153, dated Mar. 5, 2019, with an English translation.
Decision to Decline the Amendment issued by the Japan Patent Office for corresponding Japanese Patent Application No. 2016-569153, dated Mar. 5, 2019, with an English translation.
Motorola Mobility, "Mutual Discovery for Device to Device Communication", Agenda Item: 7.5.1, 3GPP TSG-RAN WG2 Meeting #83, R2-132917, Barcelona, Spain, Aug. 19-23, 2013.
CATT, "Considerations on D2D communication", Agenda Item: 7.2.8.1, 3GPP TSG-RAN WG1 Meeting #74, R1-133030, Barcelona, Spain, Aug. 19-23, 2013.
Notification of Reasons for Refusal issued by the Japan Patent Office for corresponding Japanese Patent Application No. 2016-569153, dated Dec. 11, 2018, with an English translation.
Notice of Preliminary Rejection issued by the Korean Intellectual Property Office for corresponding Korean Patent Application No. 10-2018-7034543, dated Jan. 21, 2019, with English translation.

(56) References Cited

OTHER PUBLICATIONS

Communication pursuant to Article 94(3) EPC—European Office Action—issued for corresponding European Patent Application No. 15877804.3, dated Aug. 20, 2019.
Reconsideration Report by Examiner before Appeal issued for corresponding Japan Patent Application 2016-569153, dated Jun. 27, 2019 with full-machine English translation.
First Notification of Office Action issued by the China National Intellectual Property Administration for corresponding Chinese Patent Application No. 201580072942.3, dated Nov. 6, 2019, with an English translation.
Notice of Reasons for Refusal issued by the Japan Patent Office for corresponding Japan Patent Application 2016-569153, dated Jan. 14, 2020, with a full machine English translation.
Notice of Reasons for Refusal issued by the Japan Patent Office for corresponding Japanese Patent Application No. 2016-569153, dated May 12, 2020, with a full English machine translation.

\* cited by examiner

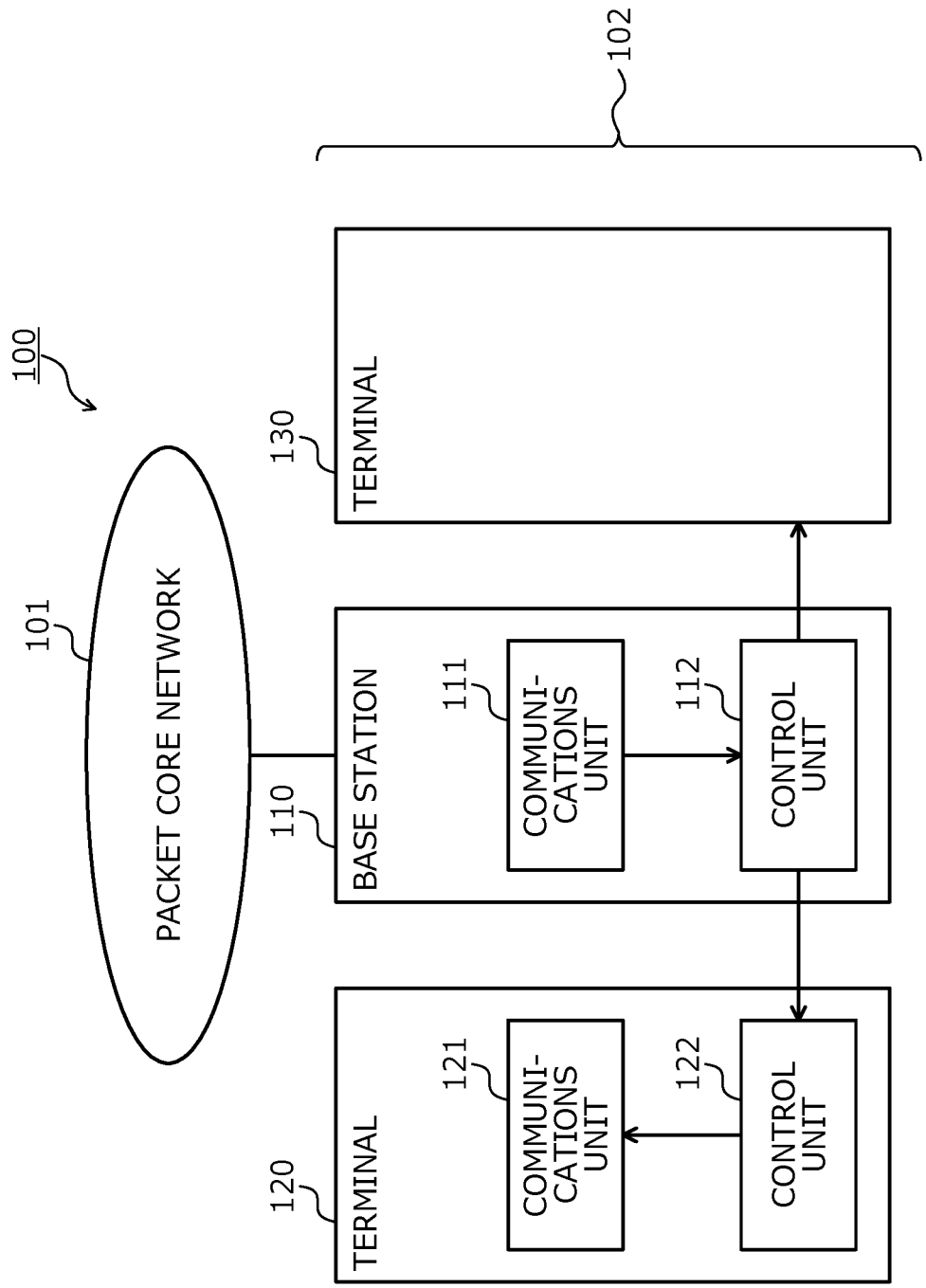

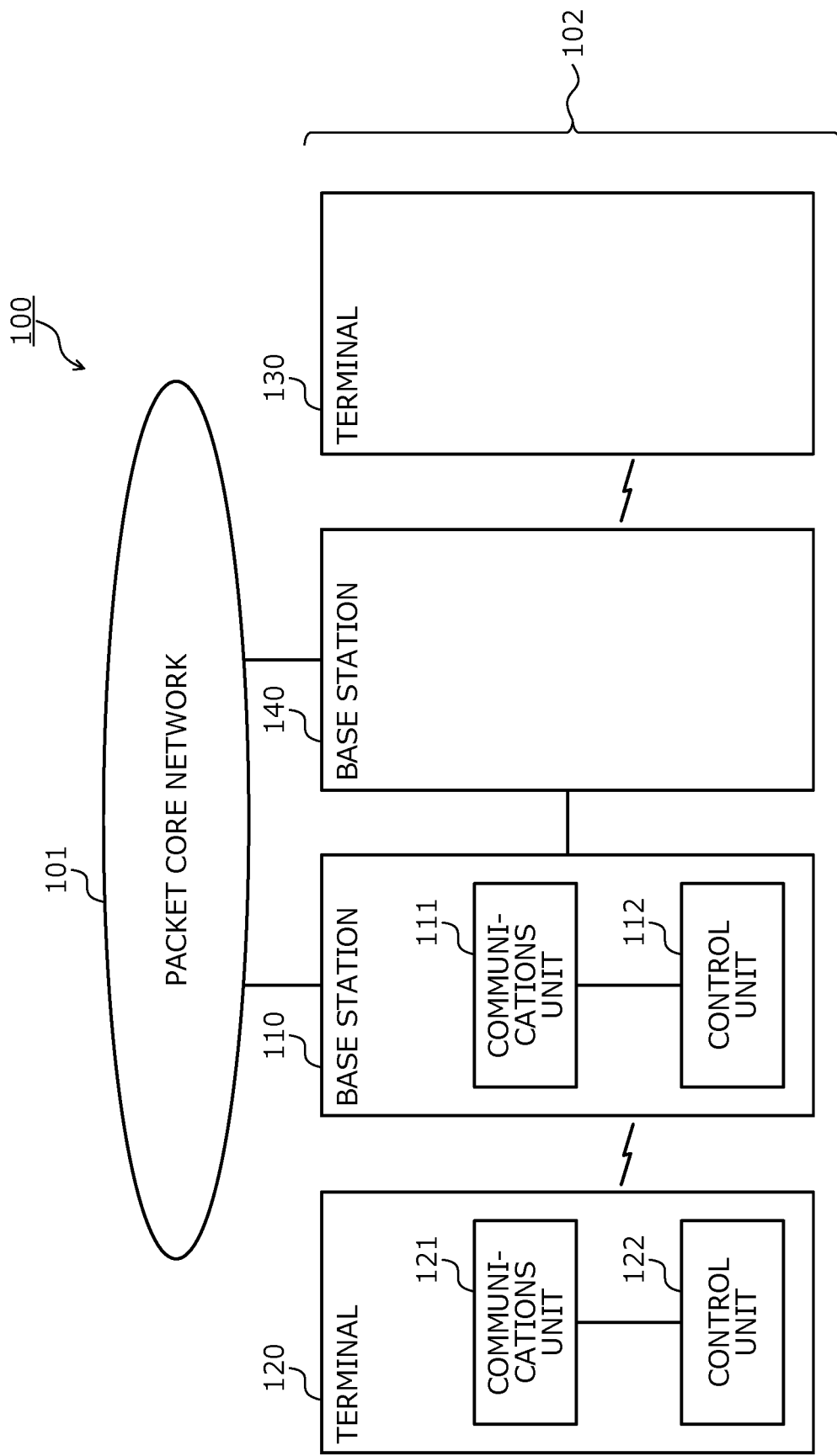

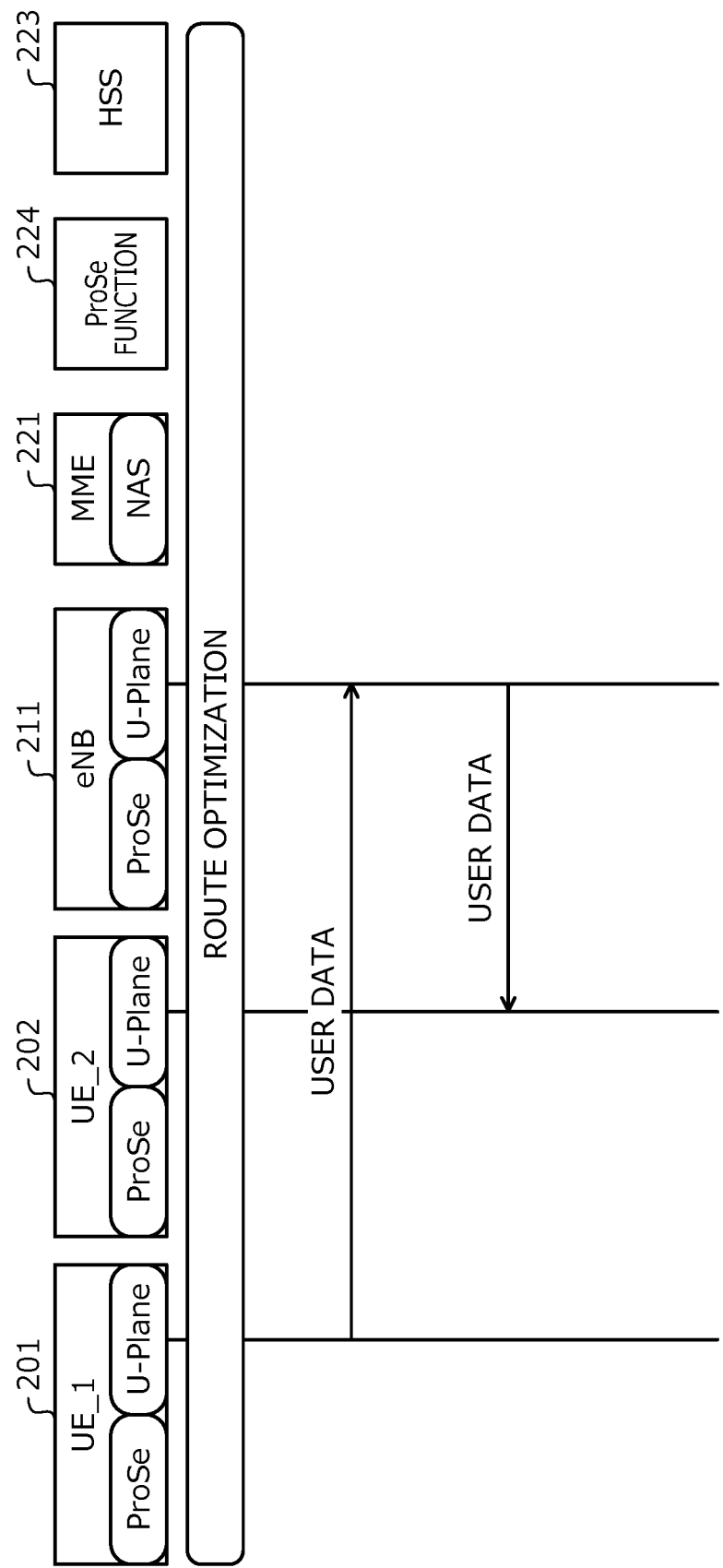

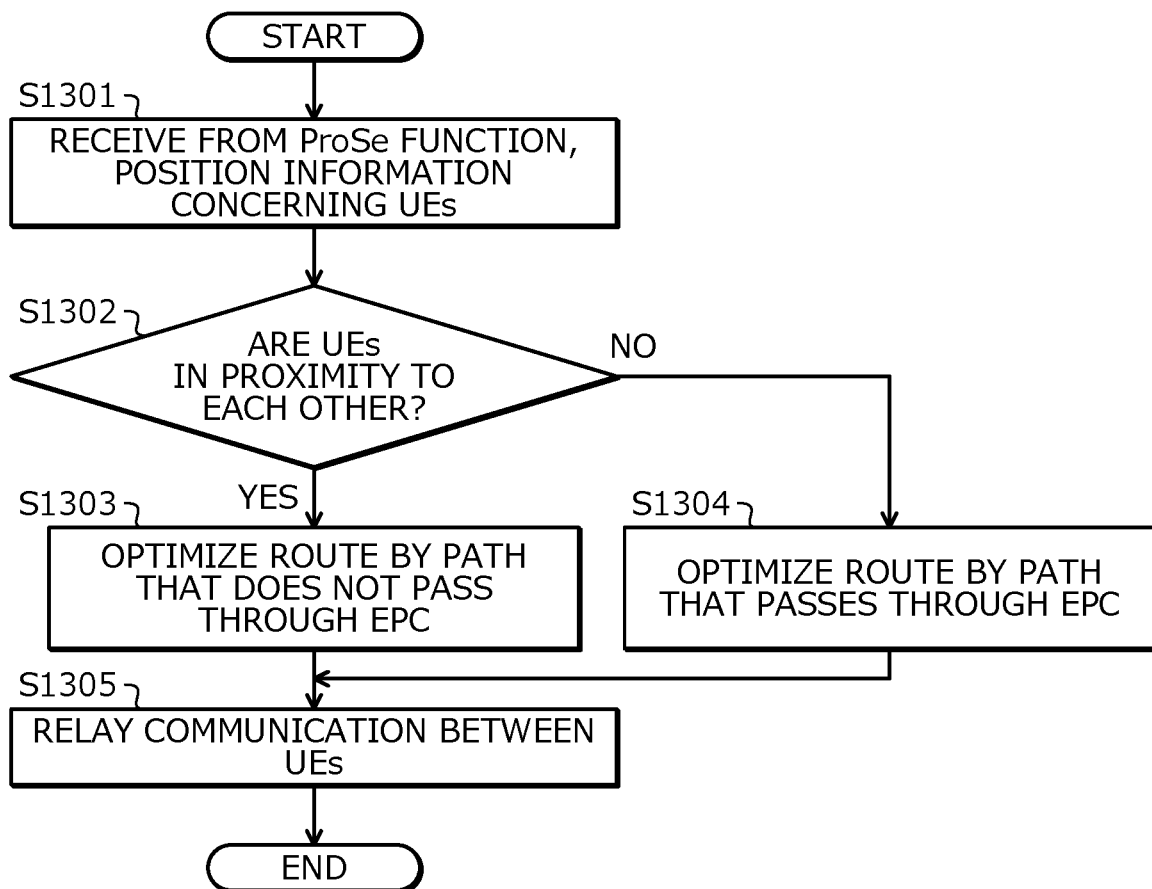

US 10,708,877 B2

WIRELESS COMMUNICATIONS SYSTEM, CONTROL STATION, AND TERMINAL

CROSS REFERENCE TO RELATED APPLICATIONS

This application is a continuation of U.S. application Ser. No. 15/636,045, filed on Jun. 28, 2017, which is a continuation application of International Application PCT/JP2015/050690, filed on Jan. 13, 2015, and designating the U.S., the entire contents of each are incorporated herein by reference.

FIELD

The embodiments discussed herein relate to a wireless communications system, a control station, and a terminal.

BACKGROUND

Mobile communication such as Long Term Evolution (LTE) and LTE-advanced are conventionally known (for example, refer to 3GPP TS36.300 V12.1.0, March 2014; 3GPP TS36.211 V12.1.0, March 2014; 3GPP TS36.212 V12.0.0, December 2013; 3GPP TS36.213 V12.1.0, March 2014; 3GPP TS36.321 V12.0.0, December 2013; 3GPP TS36.322 V11.0.0, September 2012; 3GPP TS36.323 V11.2.0, March 2013; 3GPP TS36.331 V12.0.0, December 2013; 3GPP TS36.413 V12.0.0, December 2013; 3GPP TS36.423 V12.0.0, December 2013; 3GPP TR36.842 V12.0.0, December 2013; and 3GPP TS24.301 v12.6.0, September 2014). Further, Proximity-based Services (ProSe) (function of direct communication between terminals) enabling direct communication between terminals are being studied (for example, refer to 3GPP TR36.843 V12.0.0, March 2014 and 3GPP TS33.303 v12.0.0, June 2014).

Enhancements for Infrastructure based data Communication Between Devices (eICBD) are being studied for performing communication between terminals by a shortcut path through a base station, without passing through a packet core network such as an Evolved Packet Core (EPC) or the like (for example, refer to 3GPP TR22.807 v1.0.0, June 2014).

According to a known technique, transmission packets addressed to a communications counterpart terminal are divided into and are transmitted as first packets that do not pass through a control apparatus that manages communication and second packets that pass through the control apparatus (for example, refer to Japanese Laid-Open Patent Publication No. 2012-110035).

According to another known technique, when the traffic volume concentrates unevenly at a certain wireless base station as compared to a neighbor wireless base station, paths to the neighbor wireless base station having low traffic are expanded for mobile devices of the wireless base station having high traffic, the paths being expanded through a wireless repeater (for example, refer to Japanese Laid-Open Patent Publication No. 2000-333257).

SUMMARY

According to an aspect of an embodiment, a wireless communications system includes a packet core network and a wireless access network that includes a base station and a terminal. The wireless communications system is capable of communication between terminals through a first path that includes the packet core network and communication between terminals through a second path that does not include the packet core network. The wireless communications system includes plural terminals; and a control station configured to: be capable of processing related to proximity-based communications services between the plural terminals; obtaining identifiers of the plural terminals and position information related to positions of the plurality of terminals, by the processing related to the proximity-based communications services; and causing communication between the plural terminals to be executed by the second path, based on the identifiers of the plural terminals and the position information related to the positions of the plural terminals.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1B is a diagram depicting one example of signal flow in the wireless communications system depicted in FIG. 1A;

FIG. 1C is a diagram depicting a modified example of the wireless communications system according to the first embodiment;

FIG. 9B is a sequence diagram (part 2) of the first example of processing in the wireless communications system;

FIG. 13 is a flowchart of an example of a process by the eNB.

DESCRIPTION OF THE INVENTION

Embodiments of a wireless communications system, a control station, and a terminal according to the present invention will be described in detail with reference to the accompanying drawings.

Figure 1A:
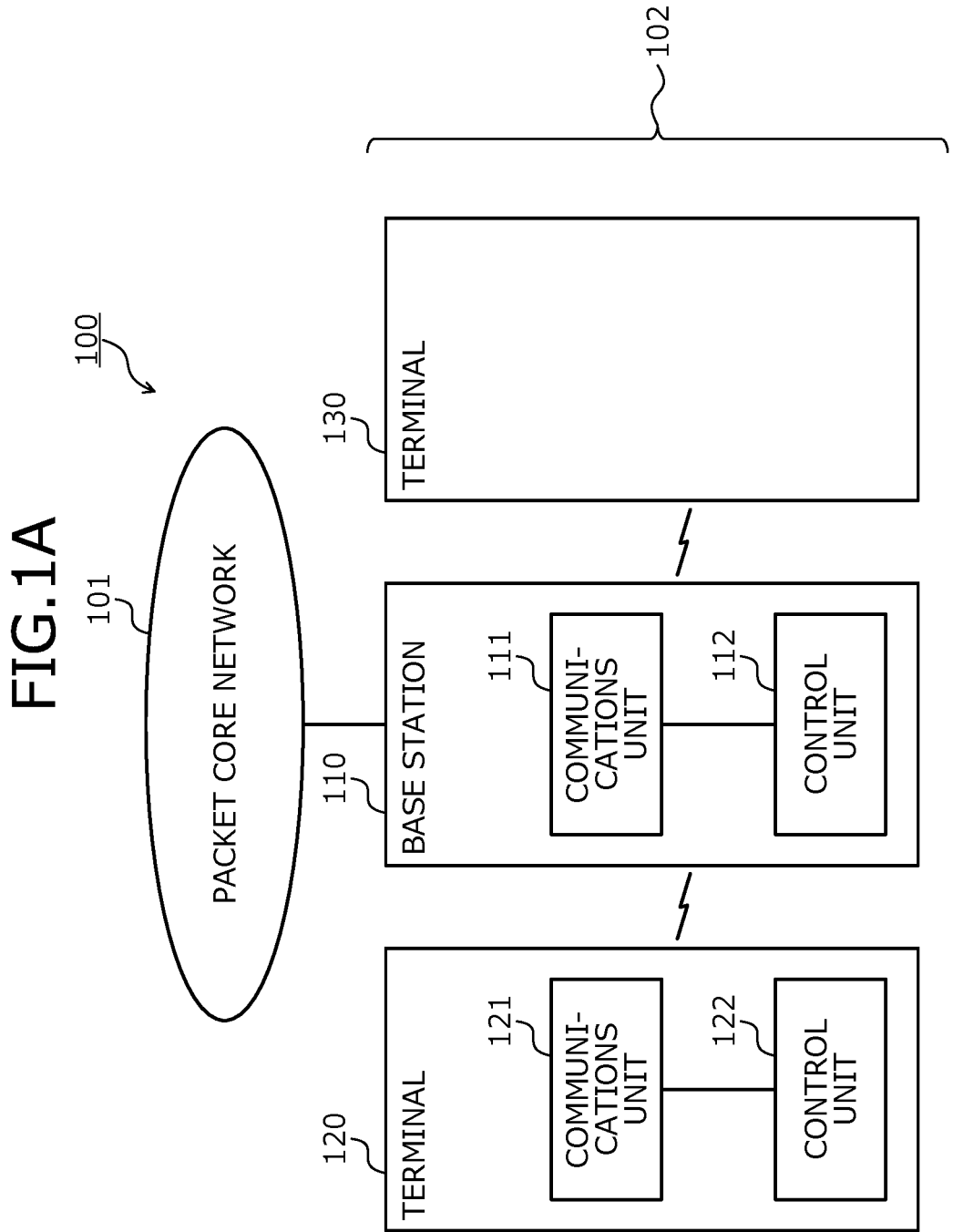
FIG. 1A is a diagram depicting one example of a wireless communications system according to a first embodiment.

FIG. 1A is a diagram depicting one example of the wireless communications system according to a first embodiment. FIG. 1B is a diagram depicting one example of signal flow in the wireless communications system depicted in FIG. 1A. As depicted in FIGS. 1A and 1B, a wireless communications system 100 according to the first embodiment includes a packet core network 101 and a wireless access network 102. The wireless access network 102 includes a base station 110 and terminals 120, 130. The packet core network 101 is a communications network that does not include the base station 110, for example, is a communications network higher than the base station 110.

In the wireless communications system 100, communication between terminals through a first path that includes the packet core network 101 is possible. A second path, for example, is a shortcut path by the base station 110. Further, in the wireless communications system 100, communications between terminals through the second path that includes no packet core network such as the packet core network 101 is also possible. The first path, for example, is a path passing through the base station 110 and the packet core network 101.

The base station 110 (control station) relays communication between the terminals 120, 130 by performing wireless communication with the terminals 120, 130. For example, the base station 110 includes a communications unit 111 and a control unit 112.

The communications unit 111 is capable of processing related to proximity-based communications services between terminals. Further, the communications unit 111 obtains identifiers of the terminals 120, 130 and position information related to positions of the terminals 120, 130 by performing the processing related to proximity-based communications services. The communications unit 111 outputs the obtained position information and identifiers of the terminals 120, 130 to the control unit 112. The position information, for example, is information that enables determination of whether the terminals 120, 130 are in proximity to each other. The position information will be described hereinafter.

Proximity-based communications services between terminals is, for example, ProSe. The processing related to proximity-based communications services between terminals is, for example, a process of accessing a communications apparatus that provides proximity-based communications services. A communications apparatus that provides proximity-based communications services is, for example, a ProSe Function. For example, the communications unit 111 has a ProSe layer processing unit thus, being capable of processing related to proximity-based communications services between terminals.

The control unit 112 controls communication between the terminals 120, 130. For example, the control unit 112 transmits a control signal to the terminals 120, 130 and thereby controls the communication between the terminals 120, 130. The control signal transmitted to the terminals 120, 130 by the control unit 112 is, for example, a response to a communication request from the terminals 120, 130 to the base station 110, information indicating a radio resource to be used by the terminals 120, 130 in wireless communication with the base station 110, etc.

Based on the position information and identifiers of the terminals 120, 130 output from the communications unit 111, the control unit 112 further performs control to cause communication between the terminals 120, 130 to be executed through the second path, which does not pass through the packet core network 101. For example, when the terminals 120, 130 are in proximity to each other based on the position information of the terminals 120, 130, the control unit 112 causes communication between the terminals 120, 130 to be executed through the second path, which does not pass through the packet core network 101. Further, when the terminals 120, 130 are not in proximity to each other, the control unit 112 causes communication between the terminals 120, 130 to be execute through the first path, which passes through the packet core network 101.

The terminals 120, 130 are mobile stations that wirelessly communicate with the base station 110. For example, the terminal 120 includes a communications unit 121 and a control unit 122. The communications unit 121 is capable of communicating with other terminals (for example, the terminal 130). The control unit 122 controls communication by the communications unit 121 based on a control signal transmitted from the base station 110. Although configuration of the terminal 120 is described, configuration of the terminal 130 is identical to that of the terminal 120.

Thus, according to the first embodiment, processing related to proximity-based communications services between terminals is implemented by the base station 110 and the base station 110 is capable of using the processing related to proximity-based communications services and ascertaining proximity between terminals. As a result, shortcut communication through a base station is executed between terminals that are in proximity to each other (for example, the terminals 120, 130) whereby the amount of traffic on the packet core network 101 can be reduced.

FIG. 1C is a diagram depicting a modified example of the wireless communications system according to the first embodiment. In FIG. 1C, portions identical to those depicted in FIGS. 1A and 1B are given the same reference characters used in FIGS. 1A and 1B, and description thereof is omitted hereinafter. As depicted in FIG. 1C, in the first embodiment, the wireless access network 102 may include the base station 110 and a base station 140, and the terminal 130 may be connected to the base station 140. The base station 140 is connected to the base station 110 by, for example, an X1 interface or the like.

In this case, the first path between the terminals 120, 130 described above is a path that passes through the base station 110, the packet core network 101, and the base station 140. Further, the second path between the terminals 120, 130 described above is a path passing through the base station 110 and the base station 140. In the second path, communication is performed between the base station 110 and the base station 140 directly or through another base station, etc., without passing through the packet core network 101.

Thus, even when terminals are connected to different base stations, the base station 110 is capable of using processing related to proximity-based communications services and ascertaining proximity between terminals. As a result, shortcut communication through multiple base stations (for example, the base stations 110, 140) is executed between terminals that are in proximity to each other (for example, the terminals 120, 130) and a reduction of traffic on the packet core network 101 is possible.

The position information is, for example, information that enables determination of whether the distance between the positions of the terminals 120, 130 is at least a predetermined distance. Information that enables determination of whether the distance between the positions of the terminals 120, 130 is at least the predetermined distance is, for example, information that can specify the distance between the positions of the terminals 120, 130. Alternatively, information that enables determination of whether the distance between the positions of the terminals 120, 130 is at least the predetermined distance may be information that can indicate whether the distance between the positions of the terminals 120, 130 is at least the predetermined distance. Information that can specify the distance between the positions of the terminals 120, 130 may be, for example, information that indicates the positions (for example, position coordinates) of the terminals 120, 130, information that can indicate the distance (for example, direct distance) between the positions of the terminals 120, 130, etc.

For example, when the position information is information that can specify the distance between the positions of the terminals 120, 130, the control unit 112 determines from the position information, the distance between the positions of the terminals 120, 130. When the determined distance is the predetermined distance or more, the control unit 112 causes communication between the terminals 120, 130 to be executed through the first path, which passes through the packet core network 101. Further, when the determined distance is less than the predetermined distance, the control unit 112 causes communication between the terminals 120, 130 to be executed through the second path, which does not pass through the packet core network 101.

Nonetheless, the position information is not limited hereto and may be any type of information related to the positions of the terminals 120, 130, provided that the position information, for example, enables determination of whether to use the second path, which does not pass through the packet core network 101.

For example, the position information may be information that enables determination of whether the areas in which terminals 120, 130 are located are the same area or enables determination of whether the areas in which the terminals 120, 130 are located are areas in proximity to each other. Information that enables determination of whether the areas in which the terminals 120, 130 are located are the same area or determination of whether the areas in which the terminals 120, 130 are located are areas that are in proximity to each other is, for example, information that indicates the areas in which the terminals 120, 130 are located. Alternatively, the information that enables determination of whether areas in which the terminals 120, 130 are located are the same area or determination of whether the areas in which the terminals 120, 130 are located are areas that are in proximity to each other may be information that indicates whether the areas in which the terminals 120, 130 are located are the same area or that indicates whether the areas in which the terminals 120, 130 are located are areas that are in proximity to each other.

For example, when the position information is information that indicates the areas in which the terminals 120, 130 are located, the control unit 112 identifies from the position information, the areas in which the terminals 120, 130 are located. When the identified areas are the same area or areas that are in proximity to each other, the control unit 112 causes communication between the terminals 120, 130 to be executed through the second path, which does not pass through the packet core network 101. Further, when the identified areas are not the same area or are not areas that are in proximity to each other, the control unit 112 causes communication between the terminals 120, 130 to be executed through the first path, which passes through the packet core network 101. Whether the identified areas are areas in proximity to each other, for example, can be determined using information that specifies areas that are in proximity to each other. Information that specifies areas that are in proximity to each other may be information that is stored in the memory of the base station 110 or may be information that is received by the base station 110 from an external apparatus.

Further, the position information may be information that enables determination of whether the base stations to which the terminals 120, 130 are connected are the same base station (for example, the base station 110) or that enables determination of whether the base stations to which the terminals 120, 130 are connected are in proximity to each other. Information that enables determination of whether the base stations to which the terminals 120, 130 are connected are the same base station or that enables determination of whether the base stations are in proximity to each other is information that indicates, for example, the base stations to which the terminals 120, 130 are connected. Alternatively, information that enables determination of whether the base stations to which the terminals 120, 130 are connected are the same base station or that enables determination of whether the base stations are in proximity to each other may be information that indicates whether the base stations to which the terminals 120, 130 are connected are the same base station or that indicates whether the base stations are base stations that are in proximity to each other.

For example, when the position information is information that indicates the base stations to which the terminals 120, 130 are connected, the control unit 112 identifies from the position information, the base stations to which the terminals 120, 130 are connected. When the identified base stations are the same base station or are base stations that are in proximity to each other, the control unit 112 causes communication between the terminals 120, 130 to be executed through the second path, which does not pass through the packet core network 101. Further, when the identified base stations are not the same base station or are not in proximity to each other, the control unit 112 causes communication between the terminals 120, 130 to be executed through the first path that passes through the packet core network 101. Whether the identified base stations are base stations in proximity to each other, for example, can be determined using information that specifies base stations that are in proximity to each other. Information that specifies base stations that are in proximity to each other may be information stored in the memory of the base station 110 or may be information received by the base station 110 from an external apparatus.

Further, the position information may be information that enables determination of whether cells to which the terminals 120, 130 are connected are the same cell (for example, a cell of the base station 110) or determination of whether the cells to which the terminals 120, 130 are connected are cells that are in proximity to each other. Information that enables determination of whether cells to which the terminals 120, 130 are connected are the same cell or determination of whether the cells to which the terminals 120, 130 are connected are cells that are in proximity to each other is, for example, information that indicates the cells to which the terminals 120, 130 are connected. Alternatively, information that enables determination of whether the cells to which the terminals 120, 130 are connected are the same cell or determination of whether the cells to which the terminals 120, 130 are connected are cells that are in proximity to each other may be information that indicates whether the cells to which the terminals 120, 130 are connected are the same cell or that indicates whether the cells are cells that are in proximity to each other.

For example, when the position information is information that indicates the cells to which the terminals 120, 130 are connected, the control unit 112 identifies from the position information, the cells to which the terminals 120, 130 are connected. When the identified cells are the same cell or are cells that are in proximity to each other, the control unit 112 causes communication between the terminals 120, 130 to be executed through the second path, which does not pass through the packet core network 101. Further, when the identified cells are not the same cell or are not cells that are in proximity to each other, the control unit 112 causes communication between the terminals 120, 130 to be executed through the first path, which passes through the packet core network 101. Whether the identified cells are cells that are in proximity to each other, for example, can be determined using information specifying cells that are in proximity to each other. Information specifying cells that are in proximity to each other may be information stored on the memory of the base station 110 or may be received by the base station 110 from an external apparatus.

Further, the position information is information that enables determination of whether the distance between the positions of the base stations to which the terminals 120, 130 are connected is at least a predetermined distance. Information that enables determination of whether the distance between the positions of the base stations to which the terminals 120, 130 are connected is at least the predetermined distance, for example, may be information that can specify the distance between the positions of the base stations or information that can indicate whether the distance between the positions of the base stations is at least the predetermined distance. Information that can specify the distance between the positions of the base stations, for example, may be information that indicates the positions (for example, position coordinates) of the base stations, information that indicates the distance (for example, direct distance) between the positions of the base stations, etc.

For example, when the position information is information that can specify the distance between the positions of the base stations to which the terminals 120, 130 are connected, the control unit 112 determines from the position information, the distance between the positions of the base stations to which the terminals 120, 130 are connected. When the determined distance is the predetermined distance or more, the control unit 112 causes communication between the terminals 120, 130 to be executed through the first path, which passes through the packet core network 101. Further, when the determined distance is less than the predetermined distance, the control unit 112 causes communication between the terminals 120, 130 to be executed through the second path, which does not pass through the packet core network 101.

Further, the position information is information that enables determination of whether a relay count (for example, a count of the X1 interfaces) between base stations to which the terminals 120, 130 are connected is at least a predetermined count. Information that enables determination of whether a relay count between base stations to which the terminals 120, 130 are connected is at least the predetermined count, for example, may be information that can specify the relay count between the base stations, information that indicates whether the relay count between the base stations is at least the predetermined count, etc.

For example, when the position information is information that can specify the relay count between the base stations to which the terminals 120, 130 are connected, the control unit 112 obtains from the position information, the relay count between the base stations to which the terminals 120, 130 are connected. When the obtained relay count is the predetermined count or more, the control unit 112 causes communication between the terminals 120, 130 to be executed through the first path, which passes through the packet core network 101. Further, when the obtained relay count is less than the predetermined count, the control unit 112 causes communication between the terminals 120, 130 to be executed through the second path, which does not pass through the packet core network 101.

The position information of these various types is information that by providing the base station 110 with a processing unit related to proximity-based communications services, can be obtained by the base station 110 from a communications apparatus that provides, for example, proximity-based communications services.

Criteria for determining whether to use the second path, which does not pass through the packet core network 101, for example, can be set according to whether the amount of delay of communication between the terminals 120, 130 when the second path that does not pass through the packet core network 101 is used is less than a predetermined amount. In other words, the predetermined distances, the information indicating areas that are in proximity to each other, the information indicating base stations that are in proximity to each other, the information indicating cells that are in proximity to each other, etc. described above, for example, can be set based on the amount of delay of the communication between the terminals 120, 130 when the second path is used.

The node that is to finally realize the shortcut path can be determined by a node of the packet core network. For example, in the packet core network 101, an MME 221 (control station) that manages bearers that are transmission paths is a starting point and starts the shortcut communication.

Since the MME 221 and a ProSe function 224 are connected by S6a and PC4a interfaces through a HSS 223, the MME 221 is capable of obtaining the position information ascertained by the ProSe function and based on the position information, is capable of determining whether to implement the shortcut communication through a base station. When the shortcut communication is to be implemented, communication path configuration, bearer configuration, etc. is performed. Alternatively, since the MME 221 and eNBs are connected by an S1-C interface, the MME 221 is capable of obtaining the position information ascertained by the base station and based on the position information, determining whether shortcut communication through a base station is to be implemented. When shortcut communication is to be implemented, communication path configuration, bearer configuration, etc. is performed.

Figure 2:
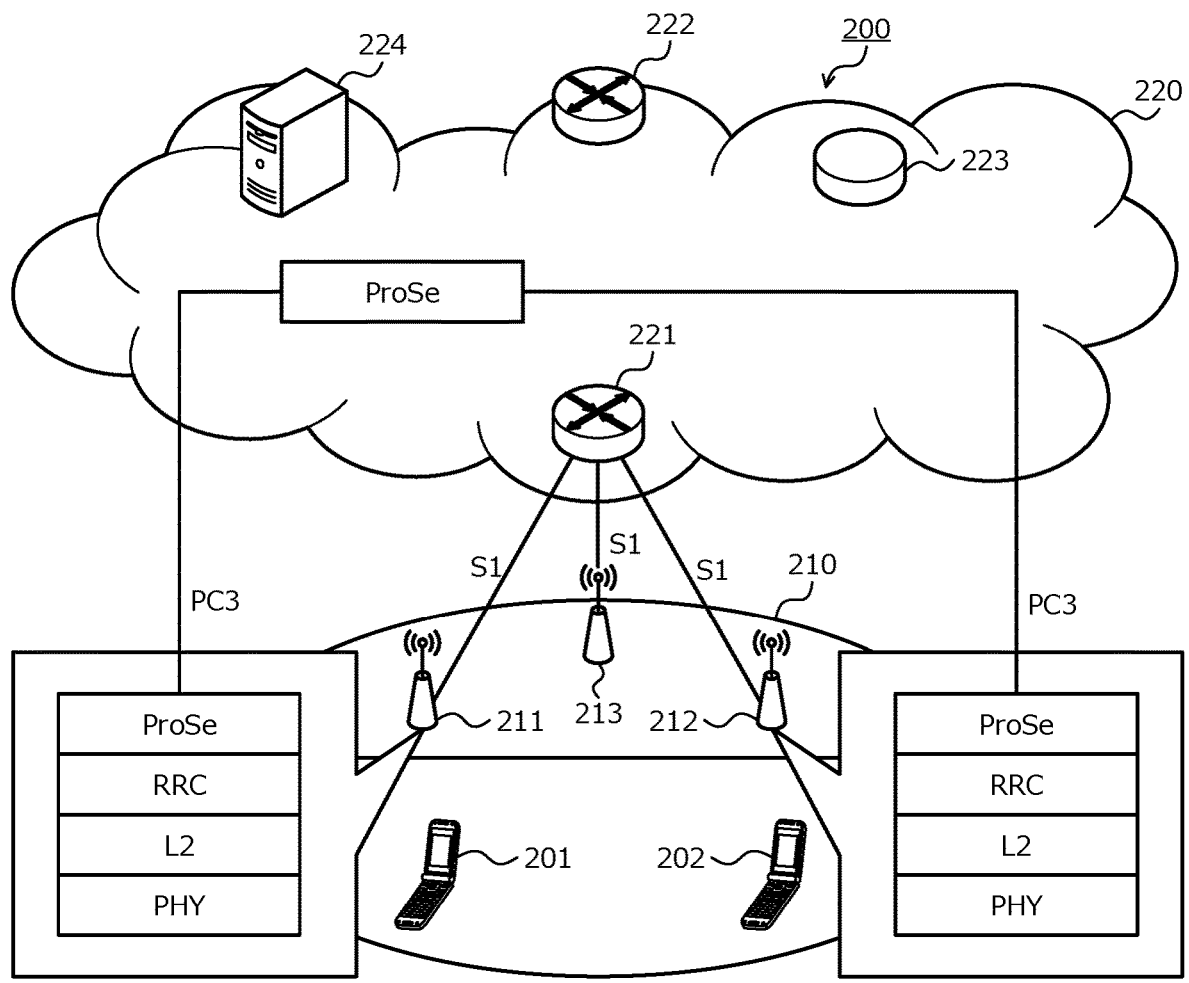
FIG. 2 is a diagram depicting one example of the wireless communications system according to a second embodiment.

FIG. 2 is a diagram depicting one example of the wireless communications system according to a second embodiment. As depicted in FIG. 2, a wireless communications system 200 according to the second embodiment includes a wireless access network 210 and an EPC 220. The wireless access network 210 is a communications network on which wireless communication is performed. For example, the wireless access network 210 includes User Equipment ((UEs): user terminals) 201, 202, and evolved Nodes B (eNBs) 211 to 213.

The EPC 220 is a packet core network in the wireless communications system 200. For example, the EPC 220 includes the MME 221 (Mobility Management Entity), a gateway 222 (S/PGW), the HSS 223 (Home Subscriber Server), and the ProSe function 224.

The UEs 201, 202 each performs wireless communication with at least one of the eNBs 211 to 213 and thus, is capable of wireless communication with the EPC 220 via at least one of the eNBs 211 to 213. Further, the UEs 201, 202 are capable of communicating with each other via at least one of the eNBs 211 to 213.

The eNBs 211 to 213 are each a base station that performs wireless communication with the UEs 201, 202 to thereby relay communication between the EPC 220 and the UEs 201, 202. Further, the eNBs 211 to 213 are each connected to the MME 221 via an S1 interface. Further, the eNBs 211 to 213 are each connected to the ProSe function 224 via a PC3 interface.

The MME 221 accommodates the eNBs 211 to 213 and performs a Control plane (C-plane) process for network control.

The gateway 222 is a gateway in the EPC 220. For example, the gateway 222 includes a Serving Gateway (S-GW) that manages a User-plane of user data, a Packet data network Gateway (P-GW) for connecting to an external network, a corporate intranet, etc.

The HSS 223 is a server that manages service control and subscriber data.

The ProSe function 224 is a communications apparatus that performs a process related to proximity-based communications services (ProSe) at the UEs 201, 202. For example, the ProSe function 224 is capable of obtaining position information related to the positions of the UEs 201, 202 in order to provide ProSe.

For example, the ProSe function 224 is capable of obtaining position information based on report information from the UEs 201, 202. The report information, for example, is information that indicates measurement results of position coordinates of the UEs 201, 202, obtained by a Global Positioning System (GPS) unit in the UEs 201, 202. Alternatively, the report information may be identification information of the cell or base station to which the UEs 201, 202 are connected. The ProSe function 224 may be an independent communications apparatus or may be provided in another communications apparatus.

Further, the eNB 211 and the eNB 212 can implement a ProSe protocol. The eNB 213 can also implement the ProSe protocol. The ProSe protocol may be configured as, for example, a higher layer of a Radio Resource Control (RRC) protocol, a layer 2 (L2) protocol, and a physical layer (PHY) protocol.

As a result, the eNBs 211 to 213 are able to access the ProSe protocol of the ProSe function 224. In this access, for example, use of the PC3 interface is possible. As a result, the eNBs 211 to 213 are capable of using the ProSe protocol and obtaining from the ProSe function 224, position information related to the positions of the UEs 201, 202.

The packet core network 101 depicted in FIGS. 1A to 1C, for example, can be implemented by the EPC 220. The wireless access network 102 depicted in FIGS. 1A to 1C, for example, can be implemented by the wireless access network 210. The base stations 110, 140 depicted in FIGS. 1A to 1C, for example, can be implemented by the eNBs 211 to 213. The terminals 120, 130 depicted in FIGS. 1A to 1C, for example, can be implemented by the UEs 201, 202.

Figure 3:
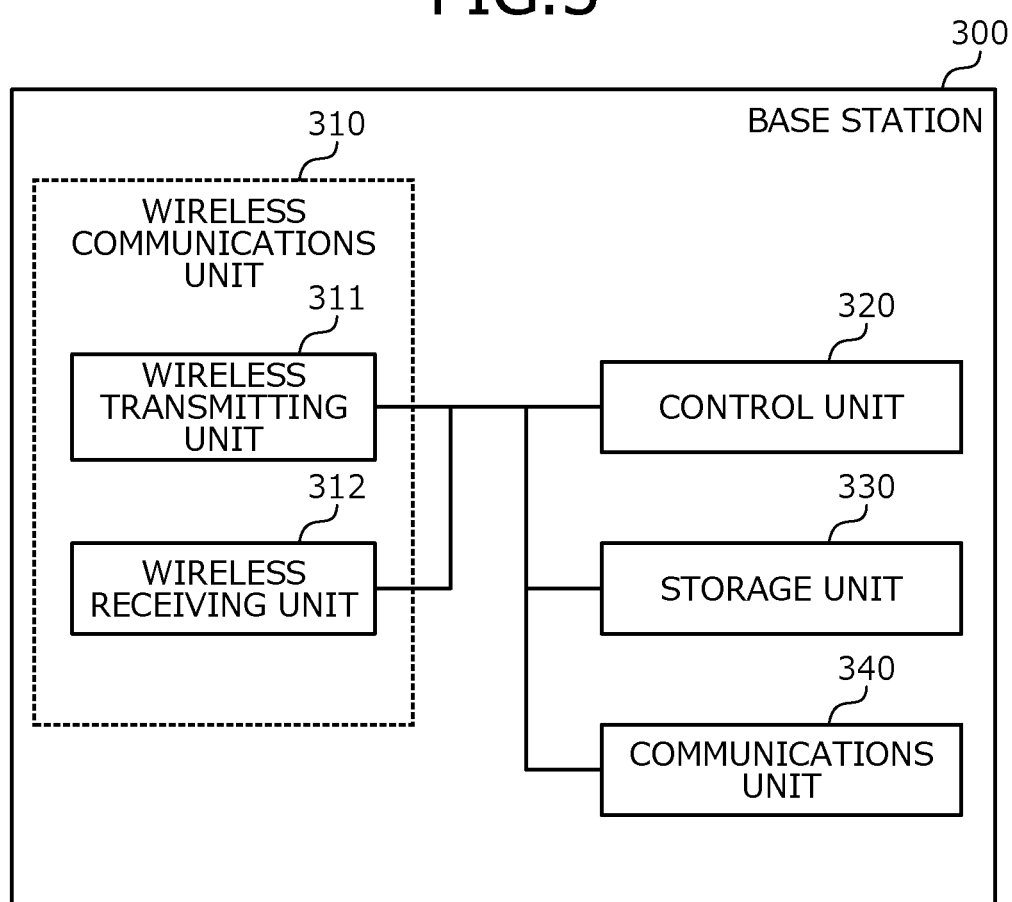
FIG. 3 is a diagram depicting one example of a base station.

FIG. 3 is a diagram depicting one example of the base station. The eNBs 211 to 213 can each be implemented by, for example, a base station 300 depicted in FIG. 3. As depicted in FIG. 3, the base station 300 includes, for example, a wireless communications unit 310, a control unit 320, a storage unit 330, and a communications unit 340. The wireless communications unit 310 includes a wireless transmitting unit 311 and a wireless receiving unit 312. These configurations are connected to enable unidirectional or bidirectional input and output of data and signals.

The wireless transmitting unit 311 transmits user data and a control signal by wireless communication, via an antenna. A wireless signal transmitted by the wireless transmitting unit 311 can include arbitrary user data, control information, etc. (that has been encoded, modulated, etc.). The wireless receiving unit 312 receives user data and control signals by wireless communication, via an antenna. A wireless signal received by the wireless receiving unit 312 can include arbitrary user data, a control signal, etc. (that has been encoded, modulated, etc.). A common antenna may be used for transmission and reception.

The control unit 320 outputs to the wireless transmitting unit 311, user data and control signals that are to be transmitted to another wireless station. Further, the control unit 320 obtains user data and control signals received by the wireless receiving unit 312. The control unit 320 performs the input and output of programs, control information, user data, etc. with respect to the storage unit 330 described hereinafter. Further, the control unit 320 performs with respect to the communications unit 340 described hereinafter, the input and output of control signals and user data transmitted to and received from another communications apparatus, etc. The control unit 320 additionally performs various types of control in the base station 300.

The storage unit 330 stores various types of information such as user data, control information, programs, etc. The communications unit 340, for example, by a wired signal, transmits to and receives from another communications apparatus, user data and control signals.

The communications unit 111 of the base station 110 depicted in FIGS. 1A to 1C, for example, can be implemented by the control unit 320 and the communications unit 340. The control unit 112 of the base station 110 depicted in FIGS. 1A to 1C, for example, can be implemented by the wireless communications unit 310, the control unit 320, and the communications unit 340.

Figure 4:
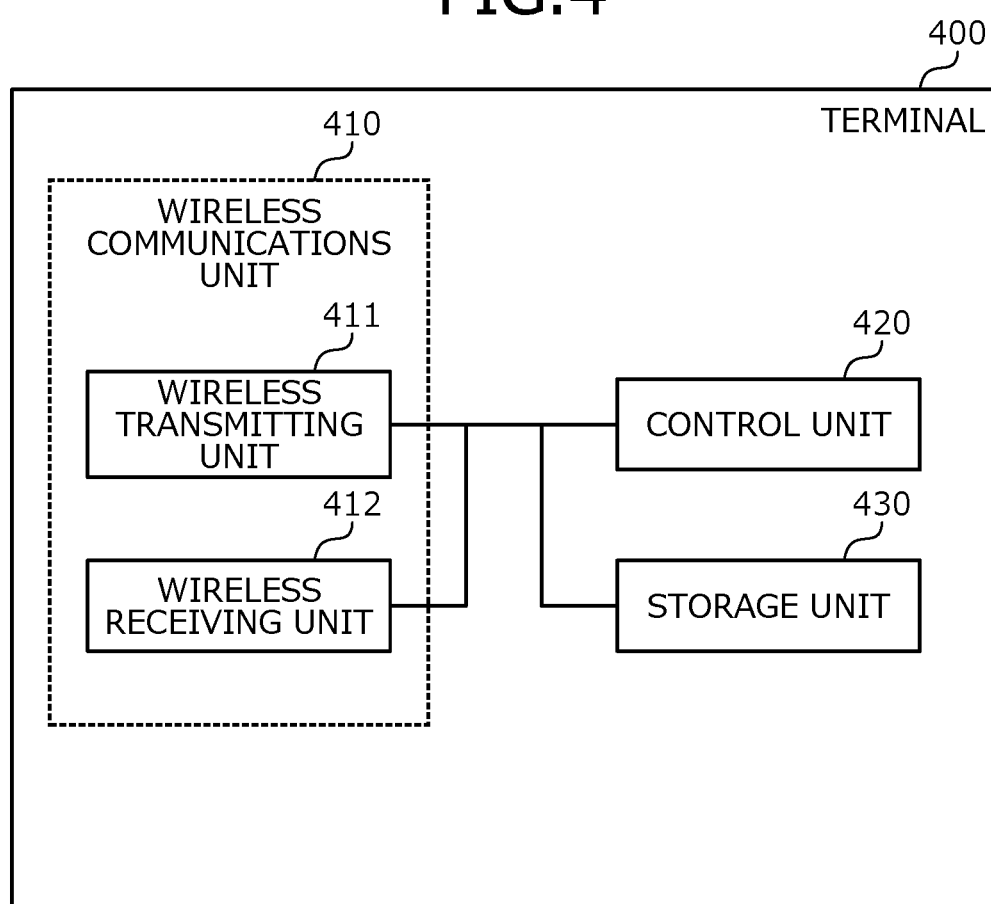
FIG. 4 is a diagram depicting one example of a terminal.

FIG. 4 is a diagram depicting one example of a terminal. The UEs 201, 202, for example, can be implemented by a terminal 400 depicted in FIG. 4. The terminal 400 includes a wireless communications unit 410, a control unit 420, and a storage unit 430. The wireless communications unit 410 includes a wireless transmitting unit 411 and a wireless receiving unit 412. These configurations are connected to enable unidirectional or bidirectional input and output of data and signals.

The wireless transmitting unit 411 transmits user data and a control signal by wireless communication, via an antenna. A wireless signal transmitted by the wireless transmitting unit 411 can include arbitrary user data, control information, etc. (that has been encoded, modulated, etc.). The wireless receiving unit 412 receives user data and control signals by wireless communication, via an antenna. A wireless signal received by the wireless receiving unit 412 can include arbitrary user data, a control signal, etc. (that has been encoded, modulated, etc.). A common antenna may be used for transmission and reception.

The control unit 420 outputs to the wireless transmitting unit 411, user data and control signals that are to be transmitted to another wireless station. Further, the control unit 420 obtains user data and control signals received by the wireless receiving unit 412. The control unit 420 performs the input and output of programs, control information, user data, etc. with respect to the storage unit 430 described hereinafter. Further, the control unit 420 performs with respect to a communications unit described hereinafter, the input and output of control signals and user data transmitted to and received from another communications apparatus, etc. The control unit 420 additionally performs various types of control in the terminal 400.

The storage unit 430 stores various types of information such as user data, control information, programs, etc.

The communications unit 121 of the terminal 120 depicted in FIGS. 1A to 1C, for example, can be implemented by the wireless communications unit 410. The control unit 122 of the terminal 120 depicted in FIGS. 1A to 1C, for example, can be implemented by the wireless communications unit 410 and the control unit 420.

Figure 5:
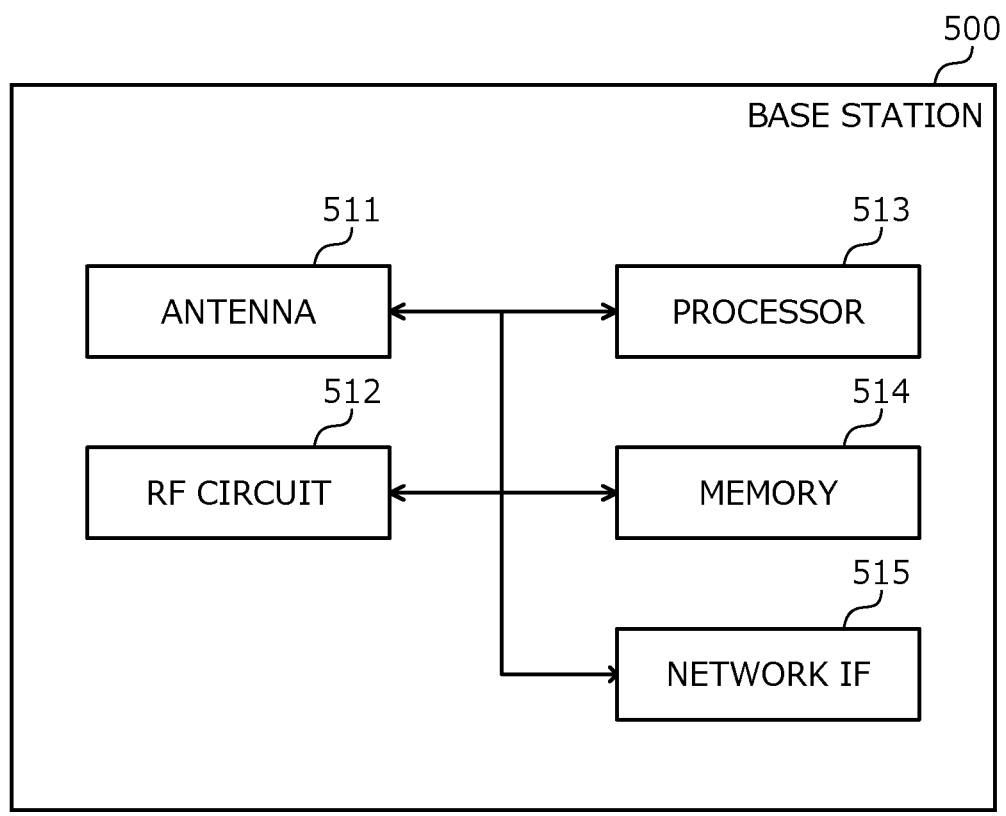
FIG. 5 is a diagram depicting one example of hardware configuration of the base station.

FIG. 5 is a diagram depicting one example of hardware configuration of the base station. The base station 300 depicted in FIG. 3, for example, can be implemented by a base station 500 depicted in FIG. 5. The base station 500 includes an antenna 511, an RF circuit 512, a processor 513, a memory 514, and a network IF 515. These components, for example, are connected via a bus so as to enable the input and output of various signals and data.

The antenna 511 includes a transmission antenna that transmits wireless signals and a reception antenna that receives wireless signals. Further, the antenna 511 may be a common antenna used for both transmitting and receiving wireless signals. The RF circuit 512 performs a Radio Frequency ((RF): high frequency) process for signals received by the antenna 511 and signals transmitted by the antenna 511. The RF process, for example, includes frequency conversion for a baseband width and an RF band.

The processor 513, for example, is a central processing unit (CPU), a digital signal processor (DSP), or the like. Further, the processor 513 can be implemented by a digital electronic circuit such as an Application Specific Integrated Circuit (ASIC), a Field Programmable Gate Array (FPGA), a Large Scale Integration ((LSI): large-scale integrated circuit), or the like.

The memory 514, for example, can be implemented by flash memory, read-only memory (ROM), random access memory (RAM) such as Synchronous Dynamic Random Access Memory (SDRAM), etc. The memory 514 stores, for example, user data, control information, programs, and the like.

The network IF 515 is, for example, a communications interface that performs wired communication with a network. The network IF 515 may include, for example, an Xn interface for performing wired communication with a base station.

The wireless communications unit 310 depicted in FIG. 3, for example, can be implemented by the RF circuit 512, or by the antenna 511 and the RF circuit 512. The control unit 320 depicted in FIG. 3, for example, can be implemented by the processor 513 and the memory 514. The storage unit 330 depicted in FIG. 3, for example, can be implemented by the memory 514. The communications unit 340 depicted in FIG. 3, for example, can be implemented by the network IF 515.

Figure 6:
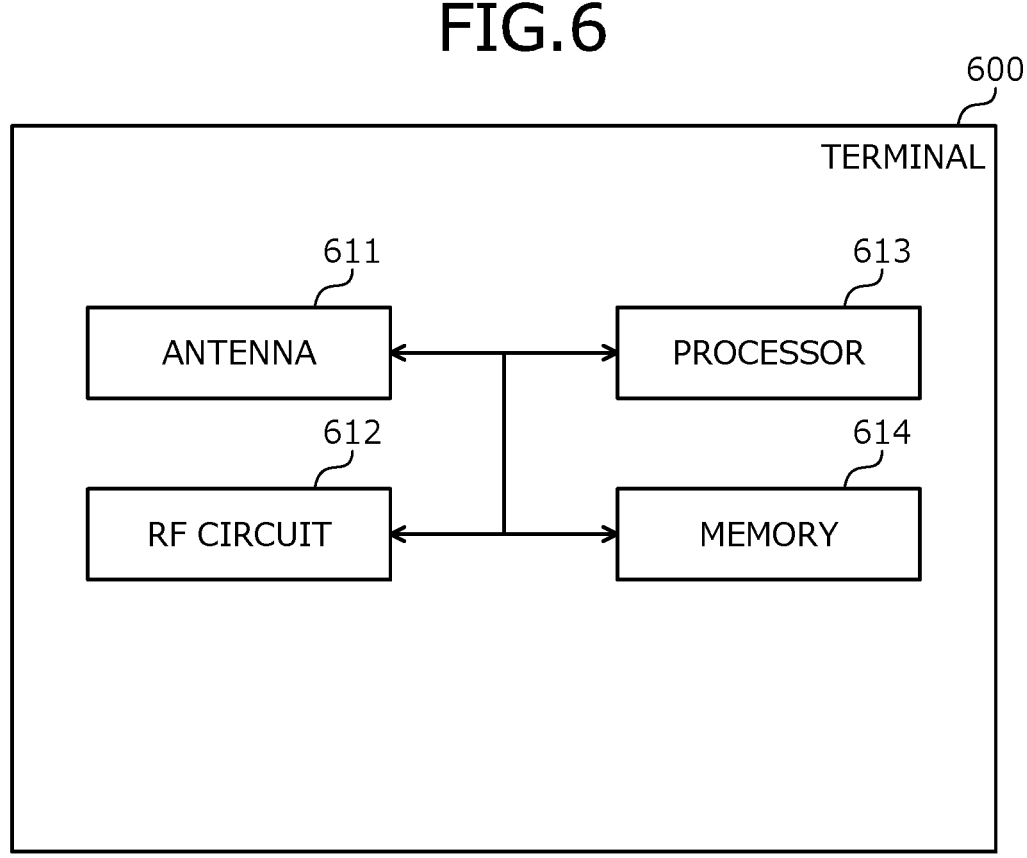
FIG. 6 is a diagram depicting one example of hardware configuration of the terminal.

FIG. 6 is a diagram depicting one example of hardware configuration of the terminal. The terminal 400, for example, can be implemented by a terminal 600 depicted in FIG. 6. The terminal 600 includes, for example, an antenna 611, an RF circuit 612, a processor 613, and a memory 614. The components, for example, are connected via a bus so as to enable the input and output of various signals and data.

The antenna 611 includes a transmission antenna that transmits wireless signals and a reception antenna that receives wireless signals. Further, the antenna 611 may be a common antenna used for both transmitting and receiving wireless signals. The RF circuit 612 performs an RF process for signals received by the antenna 611 and for signals transmitted by the antenna 611. The RF process, for example, includes frequency conversion for a baseband width and an RF band.

The processor 613, for example, is a CPU, a DSP, or the like. Further, the processor 613 may be implemented by a digital electronic circuit such as an ASIC, a FPGA, an LSI, or the like.

The memory 614, for example, can be implemented by flash memory, ROM, RAM such as SDRAM, etc. The memory 614 stores, for example, user data, control information, programs, and the like.

The wireless communications unit 410 depicted in FIG. 4, for example, can be implemented by the RF circuit 612, or by the antenna 611 and the RF circuit 612. The control unit 420 depicted in FIG. 4, for example, can be implemented by the processor 613 and the memory 614. The storage unit 430 depicted in FIG. 4, for example, can be implemented by the memory 614.

Figure 7:
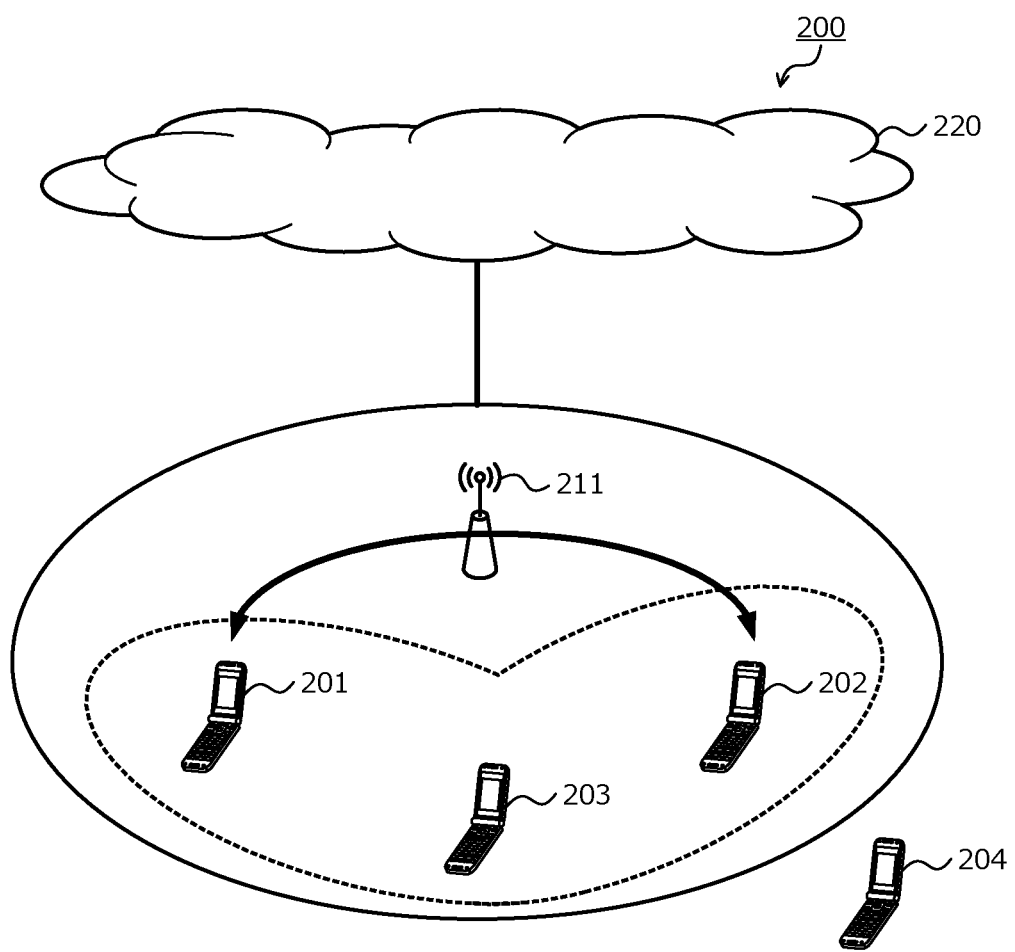
FIG. 7 is a diagram depicting one example of communication between terminals by eICBD.

FIG. 7 is a diagram depicting one example of communication between terminals by eICBD. In FIG. 7, portions depicted in FIG. 2 are given the same reference characters used in FIG. 2, and description thereof is omitted hereinafter. UEs 201 to 203 are UEs in cellular coverage of the eNB 211. UE 204 is a UE in cellular coverage of an eNB (for example, the eNB 212 depicted in FIG. 2) different from the eNB 211.

In the example depicted in FIG. 7, the UE 201 and the UE 202 are on a shortcut path by the eNB 211 and communicate with each other through a path that does not pass through the EPC 220. In other words, the UE 201 and the UE 202 each performs wireless communication with the eNB 211 and thereby communicates via the eNB 211.

As a result, since the UE 201 and the UE 202 are capable of communicating with each other through a path that does not pass through the EPC 220, a reduction of the amount of traffic flow on the EPC 220 is possible. Further, in the example depicted in FIG. 7, although an example of eICBD through one eNB (the eNB 211) is described, eICBD through plural eNBs can be performed. In this case, in the path between the plural eNBs, for example, an X2 can be used.

Figure 8:
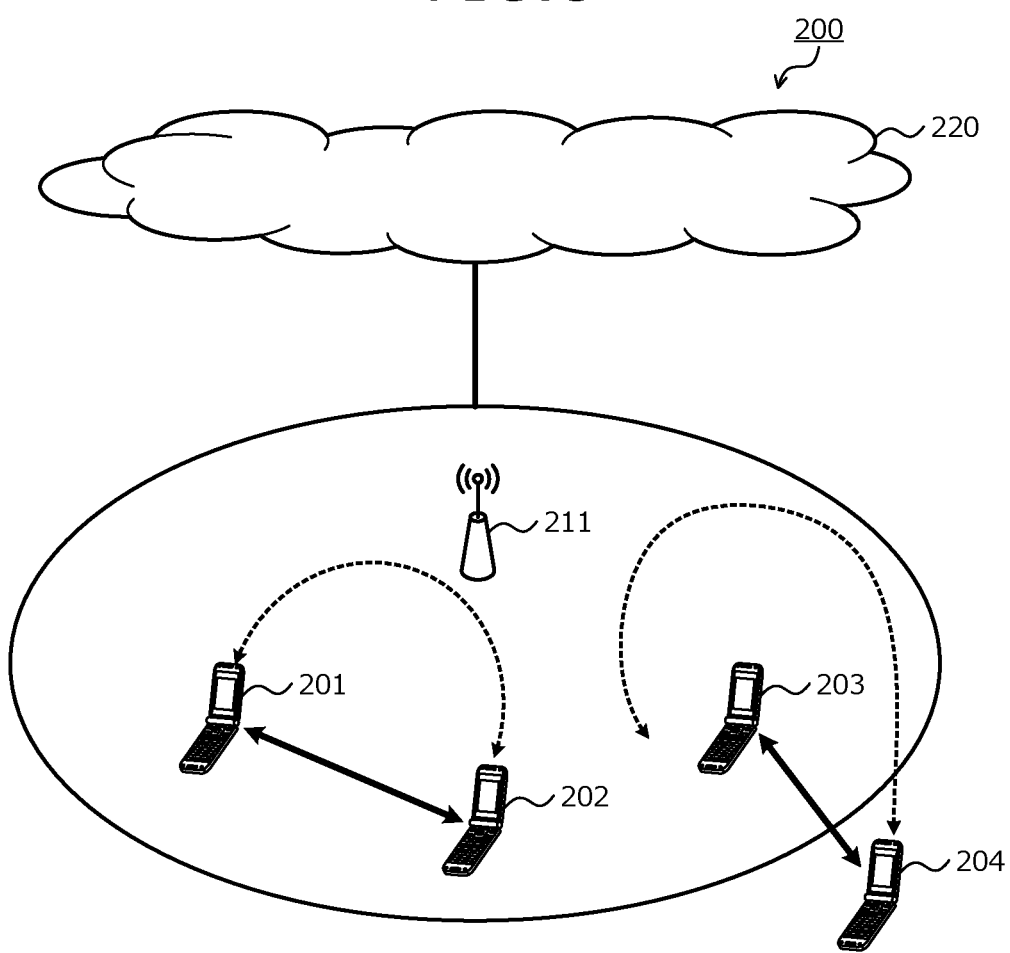
FIG. 8 is a diagram depicting one example of communication between terminals by ProSe.

FIG. 8 is a diagram depicting one example of communication between terminals by ProSe. In FIG. 8, portions identical to those depicted in FIG. 7 are given the same reference characters used in FIG. 7 and description thereof is omitted hereinafter. In the example depicted in FIG. 8, the UE 201 and the UE 202 in cellular coverage of the eNB 211 are performing direct wireless communication with each other under the control of the eNB 211.

Further, in the example depicted in FIG. 8, the UE 203 in cellular coverage of the eNB 211 and the UE 204 in cellular coverage of an eNB (for example, the eNB 212 depicted in FIG. 2) different from the eNB 211 are performing direct wireless communication with each other under the control of the eNB 211.

For example, the eNB 211 has the ProSe function depicted in FIG. 8 and is capable of using the ProSe function to obtain the position information of the UEs. Based on the obtained position information, the eNB 211 is capable of determining whether terminals are in proximity to each other and causing communication between terminals in proximity to each other to be executed according to the eICBD depicted in FIG. 7.

Figure 9A:
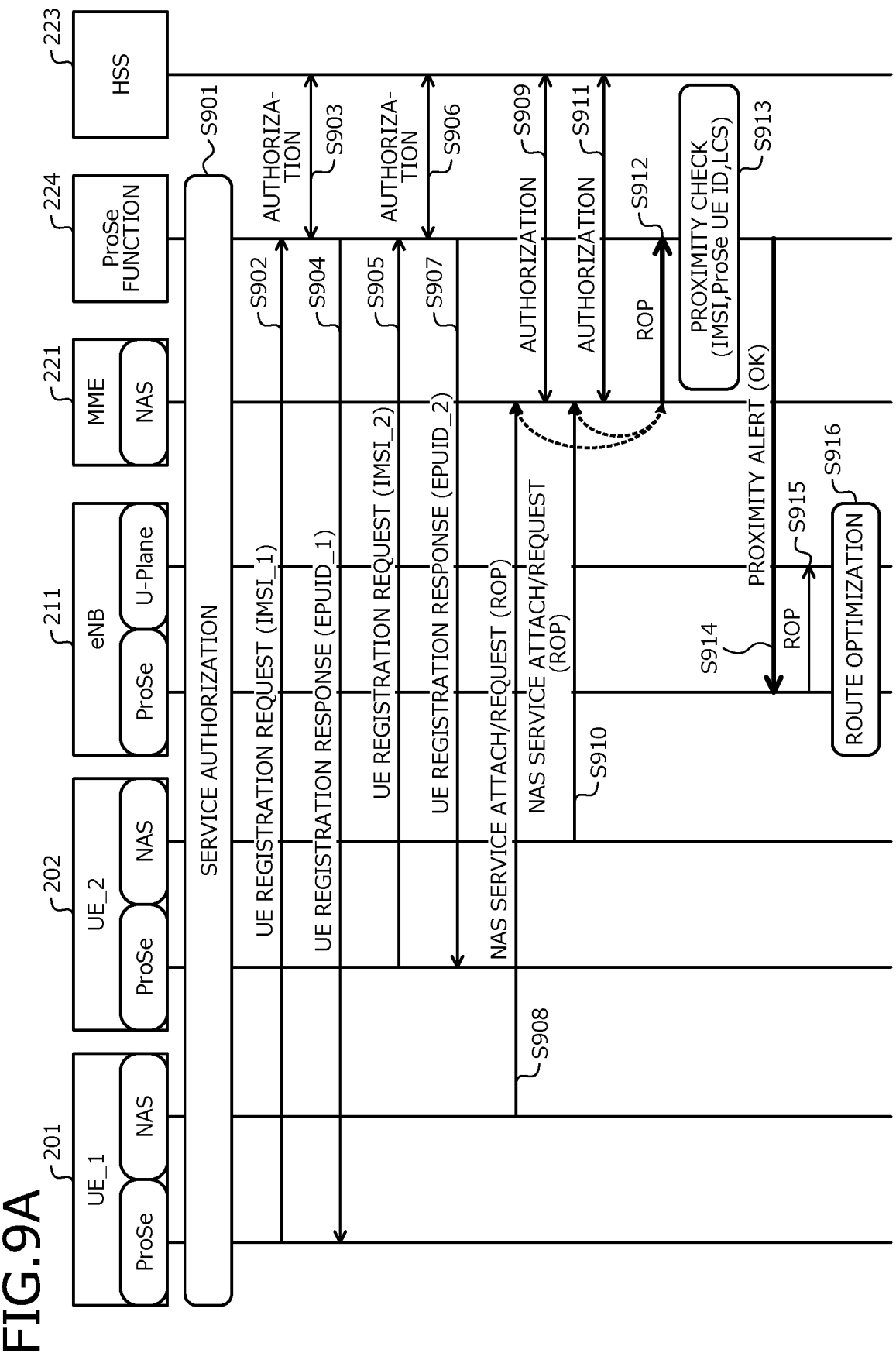
FIG. 9A is a sequence diagram (part 1) of a first example of processing in the wireless communications system.

FIG. 9A is a sequence diagram (part 1) of a first example of processing in the wireless communications system. In FIG. 9A, a case will be described in which the UEs 201, 202 and the eNB 211 are connected, and data transmission from the UE 201 to the UE 202 is performed.

First, the UE 201 (UE_1) and the UE 202 (UE_2) perform a service authorization process with the ProSe function 224 (step S901). The operation at step S901, for example, is performed by the UE 201 and the UE 202 according to the ProSe protocol, via the eNB 211.

Next, the UE 201 transmits a UE registration request (UE Registration Request) to the ProSe function 224 (step S902). The UE registration request transmitted at step S902 includes, for example, the International Mobile Subscriber Identity (IMSI) "IMSI_1" of the UE 201. The operation at step S902, for example, is performed by the UE 201 according to the ProSe protocol, via the eNB 211.

Next, the ProSe function 224 performs an authorization process (Authorization) with the HSS 223, for the communication of the UE 201 (step S903). Next, the ProSe function 224 transmits to the UE 201, a UE registration response (UE Registration Response) to the UE registration request transmitted at step S902 (step S904). The UE registration response transmitted at step S904, for example, includes the EPC ProSe User ID (EPUID) "EPUID_1" given to the UE 201. The UE registration response transmitted at step S904, for example, is received by and processed at the UE 201 according to the ProSe protocol. Furthermore, the operation at step S904 is performed via the eNB 211.

Next, the UE 202 transmits a UE registration request to the ProSe function 224 (step S905). The UE registration request transmitted at step S905 includes, for example, IMSI_2, which is the IMSI of the UE 202. The operation at step S905, for example, is performed by the UE 202 according to the ProSe protocol. Furthermore, the operation at step S905 is performed via the eNB 211.

Next, the ProSe function 224 performs an authorization process with the HSS 223, for communication of the UE 202 (step S906). Next, the ProSe function 224 transmits to the UE 202, a UE registration response to the UE registration request transmitted at step S905 (step S907). The UE registration response transmitted at step S907 includes, for example, the EPUID "EPUID_2" given to the UE 202. The UE registration response transmitted at step S907, for example, is received and processed by the UE 202 according to the ProSe protocol. Furthermore, the operation at step S907 is performed via the eNB 211.

Next, the UE 201 transmits a Non Access Stratum (NAS) attach and NAS service request (NAS Service Attach/Request) to the MME 221 (step S908). The NAS service request transmitted at step S908 includes a Routing Optimization Preference (ROP) requesting path optimization by using shortcut through the base station. The NAS service request transmitted at step S908 further includes identification information of the UE 201 such as IMSI_1, EPUID_1, etc. The operation at step S908, for example, is performed by the UE 201 and the MME 221 according to a NAS protocol. Furthermore, the operation at step S908 is performed via the eNB 211.

Next, the MME 221 performs an authorization process with the HSS 223, for communication using the ROP of the UE 201 (step S909). The operation at step S909 is performed by the MME 221 according to the NAS protocol.

Next, the UE 202 transmits a NAS attach and NAS service request to the MME 221 (step S910). The NAS service request transmitted at step S910 includes an ROP requesting path optimization by using shortcut through the base station. The NAS service request transmitted at step S910 further includes identification information of the UE 202 such as IMSI_2, EPUID_2, etc. The operation at step S910, for example, is performed by the UE 202 and the MME 221 according to the NAS protocol. Furthermore, the operation at step S910 is performed via the eNB 211.

Next, the MME 221 performs an authorization process with the HSS 223, for communication using the ROP of the UE 202 (step S911). The operation at step S911 is performed by the MME 221 according to the NAS protocol.

Next, the MME 221 transmits to the ProSe function 224, an ROP requesting path optimization through the base station for the UEs 201, 202 (step S912). The operation at step S912 is performed by the MME 221 according to the NAS protocol and based on the NAS service requests transmitted at steps S908, S910 by the UEs 201, 202. The ROP transmitted at step S912 includes identification information of the UEs 201, 202 such as IMSI_1, IMSI_2, or EPUID_1, EPUID_2, etc.

Next, the ProSe function 224 performs a proximity check whether the UEs 201, 202 are in proximity to each other (step S913). In the proximity check, for example, Location Service (LCS) information, the ProSe UE IDs (EPUID_1, EPUID_2), and the IMSIs (IMSI_1, IMSI_2) of the UEs 201, 202 are used. The LCS information of the UEs 201, 202 is information that indicates the geographical location of the UEs 201, 202.

The ProSe function 224 supports the ProSe of the UEs 201, 202 and thus, is capable of obtaining the LCS information of the UEs 201, 202. The ProSe function 224, for example, may obtain the LCS information of the UEs 201, 202 in advance (for example, periodically). Alternatively, the ProSe function 224 may obtain the LCS information of the UEs 201, 202 after receiving the ROP at step S912.

The LCS information of the UEs 201, 202 is, for example, information indicating positional coordinates of the UEs 201, 202. Alternatively, the LCS information of the UEs 201, 202 may be information indicating identification information of the area in which the UEs 201, 202 are located. Alternatively, the LCS information of the UEs 201, 202 may be the identification information of the base station (for example, the eNB 211) to which the UEs 201, 202 are connected. Alternatively, the LCS information of the UEs 201, 202 may be the identification information of the cell to which the UEs 201, 202 are connected (for example, the cell of the eNB 211).

Further, the LCS information of the UEs 201, 202 is, for example, information reported by the UEs 201, 202, to a communications apparatus (for example, the ProSe function 224) of the EPC 220, via the base station (for example, the eNB 211) to which the UEs 201, 202 are connected.

In the example depicted in FIG. 9A, whether the UEs 201, 202 are in proximity to each other is determined by a proximity check. In this case, the ProSe function 224 transmits to the eNB 211, a proximity alert (Proximity Alert) indicating that the UEs 201, 202 are in proximity to each other (OK) (step S914). The proximity alert includes identification information (for example, IMSI_1, IMSI_2 or EPUID_1, EPUID_2) of the UEs 201, 202.

The proximity alert transmitted at step S914, for example, is received and processed by the eNB 211 according to the ProSe protocol. As a result, the eNB 211 is capable of obtaining from the ProSe function 224, identifiers of the UEs 201, 202 and position information related to the positions of the UEs 201, 202.

Next, the eNB 211 outputs an ROP from a ProSe protocol processing unit to a U-Plane protocol processing unit (step S915). The eNB 211 optimizes the route of the communication of the UEs 201, 202 (step S916). The operation at step S916 is performed by the eNB 211 according to the ProSe protocol and the U-Plane protocol.

FIG. 9B is a sequence diagram (part 2) of the first example of processing in the wireless communications system. The route optimization depicted in FIG. 9B, for example, is the route optimization at step S916 depicted in FIG. 9A. In the example depicted in FIG. 9B, the communication path between the UEs 201, 202 is assumed to be configured to be a shortcut communication path through the eNB 211 followed by/as a consequence of route optimization.

First, according to the U-Plane protocol, the UE 201 transmits to the eNB 211, user data (User Plane Data) to be transmitted to the UE 202. Next, according to the U-Plane protocol, the eNB 211 performs a routing process using the optimized route and transmits to the UE 202, the user data transmitted from the UE 201.

The routing, as described above, for example, can be implemented by controlling the configuration of the communication paths, bearers, etc. by the MME 221. Alternatively, both base stations can store a table associating the identifier (address) of the counterpart base station to which communication is being performed with the ProSe ID of the mobile station and implements the routing according to the correspondence indicated by the table.

Thus, in the examples depicted in FIGS. 9A and 9B, the eNB 211 causes communication between the UEs 201, 202 to be executed through a path that does not pass through the EPC 220 whereby a reduction of traffic on the EPC 220 is possible.

In the examples depicted in FIGS. 9A and 9B, although description has been given for a case in which the ProSe function 224 determines that the UEs 201, 202 are in proximity to each other, in some instances, the ProSe function 224 may determine that the UEs 201, 202 are not in proximity to each other.

In these instances, the ProSe function 224 transmits to the eNB 211, a proximity alert indicating that the UEs 201, 202 are not in proximity to each other (NG). In this case, communication through a path passing through the eNB 211 and the EPC 220 (for example, the gateway 222) is started between the UEs 201, 202.

Figure 10:
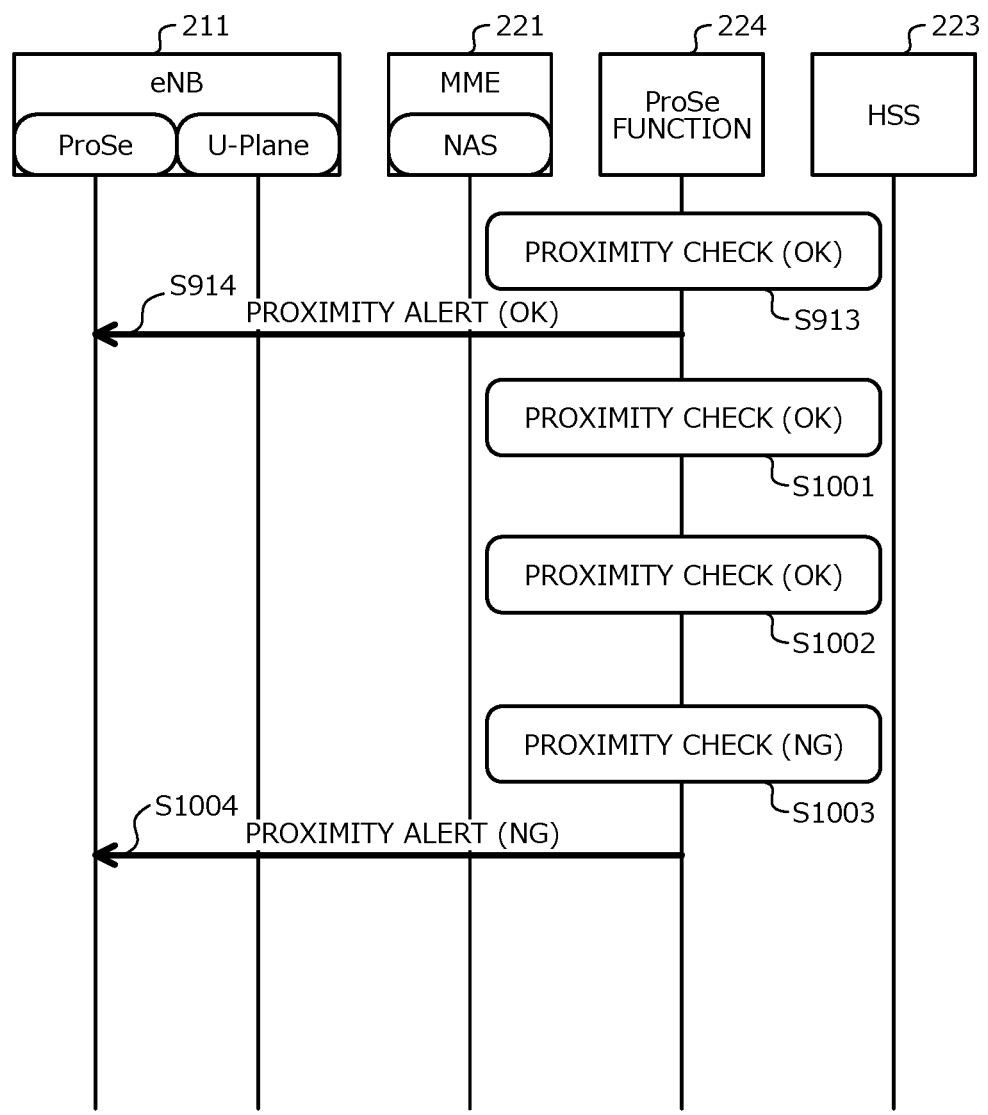
FIG. 10 is a sequence diagram of reversion in the first example of processing in the wireless communications system.

FIG. 10 is a sequence diagram of reversion in the first example of processing in the wireless communications system. In FIG. 10, portions identical to those depicted in FIG. 9A are given the same reference characters used in FIG. 9A and description thereof is omitted hereinafter.

In a case where the UEs 201, 202 have been determined to be in proximity to each other by the proximity check at step S913, the ProSe function 224 may continually (for example, periodically) perform the proximity check thereafter (steps S1001 to S1003). In the example depicted in FIG. 10, the UEs 201, 202 are assumed to be in proximity of each other (OK) as determined by the proximity checks at steps S1001, S1002. Further, the UEs 201, 202 are assumed to not be in proximity to each other (NG) as determined by the proximity check at step S1003.

In this case, the ProSe function 224 transmits to the eNB 211, a proximity alert indicating that the UEs 201, 202 are not in proximity to each other (NG) (step S1004). In this case, the communication through the path not passing through the EPC 220 depicted in FIG. 9B is suspended between the UEs 201, 202 and communication through the eNB 211 and the EPC 220 is started.

The ProSe function 224 may transmit a proximity alert (OK) to the eNB 211 each time the UEs 201, 202 are determined to be in proximity to each other (OK) by the proximity checks at steps S1001, S1002.

Figure 11:
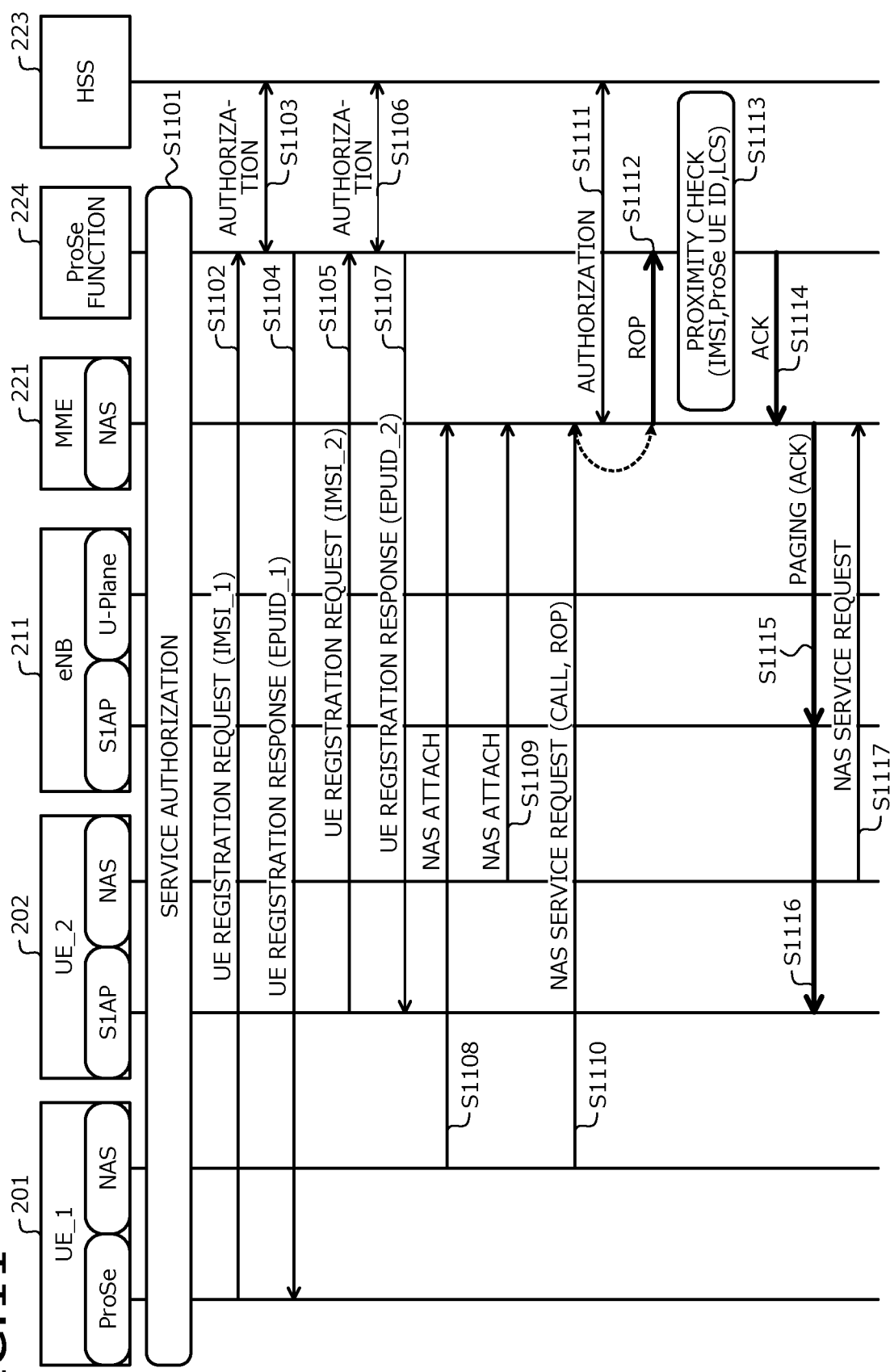
FIG. 11 is a sequence diagram of a second example of processing in the wireless communications system.

FIG. 11 is a sequence diagram of a second example of processing in the wireless communications system. In FIG. 11, a case will be described in which the UEs 201, 202 and the eNB 211 are connected, and voice communication (telephone calling) between the UEs 201, 202 is performed. Operations at steps S1101 to S1107 depicted in FIG. 11 are identical to the operations at steps S901 to S907 depicted in FIG. 9A.

After step S1107, the UE 201 transmits a NAS attach (NAS Attach) to the MME 221 (step S1108). The operation at step S1108, for example, is performed by the UE 201 and the MME 221 according to the NAS protocol. Furthermore, the operation at step S1108 is performed via the eNB 211.

The UE 202 also transmits a NAS attached to the MME 221 (step S1109). The operation at step S1109, for example, is performed by the UE 202 and the MME 221 according to the NAS protocol. Furthermore, the operation at step S1109 is performed via the eNB 211.

Next, the UE 201 transmits to the MME 221, a NAS service request (NAS Service Request) requesting an outgoing call to the UE 202 (step S1110). The NAS service request transmitted at step S1110 includes an ROP requesting path optimization by using shortcut through the base station. Further, the NAS service request transmitted at step S1110 includes identification information of the UE 201 such as IMSI_1, EPUID_1, etc. The operation at step S1110, for example, is performed by the UE 201 and the MME 221 according to the NAS protocol. Furthermore, the operation at step S1110 is performed via the eNB 211.

Next, the MME 221 performs an authorization process with the HSS 223, for voice communication between the UEs 201, 202, using the ROP (step S1111). The operation at step S1111 is performed by the MME 221 according to the NAS protocol.

Next, the MME 221 transmits to the ProSe function 224, an ROP requesting path optimization for the UEs 201, 202 by using shortcut through the base station (step S1112). The operation at step S1112 is performed by the MME 221 according to the NAS protocol and based on the NAS service request transmitted at step S1110 by the UE 201. The ROP transmitted at step S1112 includes identification information of the UEs 201, 202 such as IMSI_1, IMSI_2, or EPUID_1, EPUID_2, or the like.

Next, the ProSe function 224 performs a proximity check whether the UEs 201, 202 are in proximity to each other (step S1113). The proximity check at step S1113, for example, is identical to the proximity check at step S913 depicted in FIG. 9A. In the example depicted in FIG. 11, the UEs 201, 202 are assumed to be in proximity to each other as determined by the proximity check. In this case, the ProSe function 224 transmits to the MME 221, an ACK (ACKnowledgement) indicating that the UEs 201, 202 are in proximity to each other (step S1114). The ACK transmitted at step S1114, for example, is received and processed by the MME 221 according to the NAS protocol.

Next, the MME 221 transmits to the eNB 211, a page (Paging) that includes an ACK indicating that the UEs 201, 202 are in proximity to each other (step S1115). The page transmitted at step S1115 includes identification information of the UEs 201, 202 (for example, IMSI_1, IMSI_2, or EPUID_1, EPUID_2). As a result, the eNB 211 is capable of obtaining from the ProSe function 224, identifiers of the UEs 201, 202 and position information related to the positions of the UEs 201, 202, via the MME 221.

Next, the eNB 211 transmits to the UE 202, the page transmitted at step S1115 (step S1116) and thereby calls the UE 202. The operation at step S1116 is performed by the eNB 211 and the UE 202 according to the S1 Application Protocol (S1AP).

Next, the UE 202 transmits to the MME 221, a NAS service request requesting voice communication with the UE 201 (step S1117). The operation at step S1117, for example, is performed by the UE 202 according to the NAS protocol. Furthermore, the operation at step S1117, for example, is performed via the eNB 211.

Thus, as depicted in FIG. 9B, for example, communication through a shortcut path via the eNB 211 starts between the UEs 201, 202. However, in the example depicted in FIG. 11, since voice communication is performed between the UEs 201, 202, the communication between the UEs 201, 202 is bidirectional voice communication.

In the example depicted in FIG. 11, although a case is described in which the ProSe function 224 determines that the UEs 201, 202 are in proximity to each other, in some instances, the ProSe function 224 may determine that the UEs 201, 202 are not in proximity to each other. In such instances, the ProSe function 224 transmits via the MME 221 to the eNB 211, a page that includes a NACK (Negative ACKnowledgement) indicating that the UEs 201, 202 are not in proximity to each other. In this case, voice communication through a path passing through the eNB 211 and the EPC 220 is performed between the UEs 201, 202.

Further, in the example depicted in FIG. 11, although a process is described in which the ProSe function 224 transmits via the MME 221 to the eNB 211, an ACK indicating that the UEs 201, 202 are in proximity to each other, the process is not limited hereto. For example, the ProSe function 224 may transmit directly to the eNB 211, a proximity alert indicating that the UEs 201, 202 are in proximity to each other. As a result, the eNB 211 can be notified that the UEs 201, 202 are in proximity to each other and that shortcut communication through the base station is possible between the UEs 201, 202.

Figure 12:
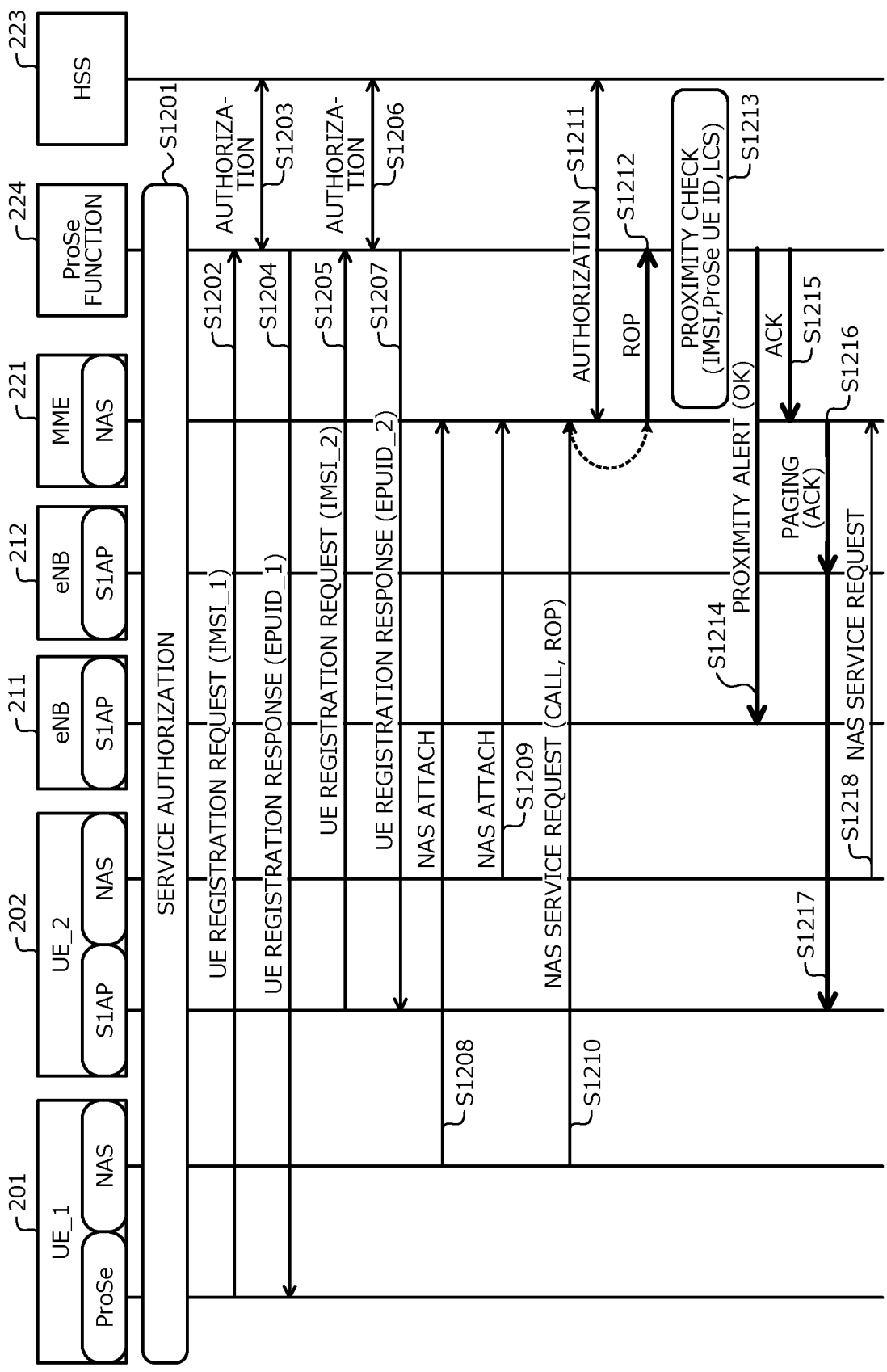
FIG. 12 is a sequence diagram of a third example of processing in the wireless communications system.

FIG. 12 is a sequence diagram of a third example of processing in the wireless communications system. In FIG. 12, a case is described in which the UEs 201, 202 are connected to the eNBs 211, 212, respectively and voice communication (telephone calling) between the UEs 201, 202 is performed.

Steps S1201 to S1213 depicted in FIG. 12 are identical to steps S1101 to S1113 depicted in FIG. 11. However, at step S1201, the UE 202 performs a service authorization process via the eNB 212. Further, steps S1205, S1207, and S1209 are performed via the eNB 212.

After step S1213, the ProSe function 224 transmits to the eNB 211, a proximity alert indicating that the UEs 201, 202 are in proximity to each other (step S1214). The proximity alert includes identification information of the UEs 201, 202. As a result, the eNB 211 can receive from the ProSe function 224, identifiers of the UEs 201, 202 and position information related to the positions of the UEs 201, 202.

Further, the ProSe function 224 transmits to the MME 221, an ACK indicating that the UEs 201, 202 are in proximity to each other (step S1215). The ACK transmitted at step S1215, for example, is received and processed by the MME 221 according to the NAS protocol.

Next, the MME 221 transmits to the eNB 212, a page that includes an ACK indicating that the UEs 201, 202 are in proximity to each other (step S1216). The page transmitted at step S1216 includes identification information of the UEs 201, 202. As a result, the eNB 212 is capable of obtaining from the ProSe function 224, identifiers of the UEs 201, 202 and position information related to the positions of the UEs 201, 202, via the MME 221.

Next, the eNB 212 transmits to the UE 202, the page transmitted at step S1216 (step S1217) and thereby calls the UE 202. The operation at step S1217 is performed by the eNB 212 and the UE 202 according to the S1AP.

Next, the UE 202 transmits to the MME 221, a NAS service request requesting voice communication with the UE 201 (step S1218). As a result, for example, as depicted in FIG. 9B, communication through a shortcut path via the wireless base station starts between the UEs 201, 202. However, in the example depicted in FIG. 12, since voice communication is performed between the UEs 201, 202, the communication between the UEs 201, 202 is bidirectional voice communication. Further, in the example depicted in FIG. 12, since the UE 202 is connected to the eNB 212, communication between the UEs 201, 202 is communication via the eNBs 211, 212. The communication between the eNBs 211, 212 in this case, for example, is performed using an X2 interface.

In the example depicted in FIG. 12, although a case is described in which the ProSe function 224 determines that the UEs 201, 202 are in proximity to each other, in some instances, the ProSe function 224 may determine that the UEs 201, 202 are not in proximity to each other. In these instances, the ProSe function 224 transmits to the eNB 211, a proximity alert indicating that the UEs 201, 202 are not in proximity to each other (NG). Further, the ProSe function 224 transmits to the eNB 212 via the MME 221, a page that includes a NACK indicating that the UEs 201, 202 are not in proximity to each other. In this case, voice communication through a path passing through the eNB 211 and the EPC 220 is started between the UEs 201, 202.

Further, in the example depicted in FIG. 12, although a process is described in which the ProSe function 224 transmits to the eNB 212 via the MME 221, an ACK indicating that the UEs 201, 202 are in proximity to each other, the process is not limited hereto. For example, the ProSe function 224 may transmit directly to the eNB 212, a proximity alert indicating that the UEs 201, 202 are in proximity to each other. As a result, the eNB 212 can be notified that the UEs 201, 202 are in proximity to each other and that shortcut communication through the base station is possible between the UEs 201, 202.

FIG. 13 is a flowchart of an example of a process by the eNB. The eNB 211, for example, executes the steps depicted in FIG. 13. Here, although a process executed by the eNB 211 will be described, the eNBs 212, 213 may also execute the same process as the eNB 211.

First, the eNB 211 receives from the ProSe function 224, position information concerning the UEs 201, 202 (each UE) that are to communicate with each other (step S1301). The position information is, for example, a proximity alert, an ACK/NACK received via the MME 221, or the like as described above.

Next, the eNB 211 determines whether the UEs 201, 202 are in proximity to each other based on the position information received at step S1301 (step S1302). When determining that UEs 201, 202 are in proximity to each other (step S1302: YES), the eNB 211 optimizes the route for the communication between the UEs 201, 202, by a path (the second path) that does not pass through the EPC 220, (step S1303).

At step S1302, when determining that the UEs 201, 202 are not in proximity to each other (step S1302: NO), the eNB 211 transitions to step S1304. In other words, the eNB 211 optimizes the route for the communication between the UEs 201, 202, by a path that passes through the EPC 220 (the first path) (step S1304).

Next, the eNB 211 relays the communication between the UEs 201, 202 based on the result of the route optimization at step S1303 or step S1304 (step S1305), and ends the series of operations.

In this manner, according to the second embodiment, the eNBs 211 to 213 can implement the ProSe protocol and the eNBs 211 to 213 are capable of using the ProSe protocol to ascertain the proximity of UEs. As a result, eICBD (shortcut communication through the base station) can be executed between UEs that are in proximity to each other (for example, between the UEs 201, 202). As a result, for example, communication in which packets do not pass through the EPC 220 is performed and a reduction of traffic on the EPC 220 is possible.

As described, according to the wireless communications system, the control station, and the terminal, traffic on a packet core network may be alleviated.

However, to conventionally perform communications between terminals by a shortcut path through a base station, without passing through a packet core network, determination of the physical proximity of the terminals has to be performed at the base station. In the conventional technique above, for example, when target terminals are connected to different base stations, determination of the physical proximity between the terminals is difficult to perform at the base stations and in some instances, the amount of traffic on the packet core network may not be reduced.

According to one aspect of the present invention, an effect is achieved in that the amount of traffic in a packet core network can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system capable of communications between terminals through a first path and communications between terminals through a second path that is different from the first path, the wireless communications system comprising:
   a plurality of terminals; and
   a base station including:
     a memory; and
     a processor coupled to the memory, the processor being configured to perform processing related to proximity-based communications between the plurality of terminals, to obtain identifiers of the plurality of terminals to control communication between the plurality of terminals to be executed through the second path according to the identifiers and whether an amount of delay of communication is less than a predetermined amount,
   wherein the processor controls the communication to be executed through the second path when the amount of delay of communication is less than the predetermined amount.

2. The wireless communications system according to claim 1, wherein the base station receives by the processing related to the proximity-based communications, the identifiers from a communications apparatus that provides the proximity-based communications.

3. A base station of a wireless communications system, the wireless communications system being capable of communications between terminals through a first path and communications between terminals through a second path that is different from the first path, the base station comprising:
   a memory; and
   a processor coupled to the memory, the processor being configured to perform processing related to proximity-based communications between a plurality of terminals, and to obtain identifiers of the plurality of terminals and to control communication between the plurality of terminals to be executed through the second path according to the identifiers and whether an amount of delay of communication is less than a predetermined amount,
   wherein the processor controls the communication to be executed through the second path when the amount of delay of communication is less than the predetermined amount.

4. The base station according to claim 3, wherein
   the processor receives, by the processing related to the proximity-based communications, the identifiers from a communications apparatus that provides the proximity-based communications.

5. The base station according to claim 3, wherein the first path is included in a packet core network.

6. The base station according to claim 3, wherein the processor further obtains information that enables determination of whether to use the second path that is different from the first path.

7. The base station according to claim 6, wherein the processor causes the communication to be executed through the second path, according to the identifiers, the information, and whether the amount of delay of communication is less than the predetermined amount.

8. The base station according to claim 3, wherein the processor controls the communication to be executed through the first path when the amount of delay of communication is the predetermined amount or more.

9. A terminal of a wireless communications system, the wireless communications system being capable of communications between terminals through a first path and communications between terminals through a second path that is different from the first path, the terminal comprising:
   a memory; and
   a processor coupled to the memory, the processor being configured to:
     control communication with a second terminal according to a control signal from a base station; and
     transmit an identifier of the terminal to the base station, the terminal performs proximity-based communications between the terminal and the second terminal, based upon identifiers of the terminal and the second terminal, and whether an amount of delay of communication is less than a predetermined amount,
   wherein the communication to be executed through the second path when the amount of delay of communication is less than the predetermined amount.

10. The terminal according to claim 9, wherein the first path is included in a packet core network.

11. The terminal according to claim 9, wherein the processor further transmits information that enables determination of whether to use the second path that is different from the first path.

12. The terminal according to claim 9, wherein the processor controls the communication to be executed through the first path when the amount of delay of communication is the predetermined amount or more.

* * * * *